US010406723B2

(12) United States Patent
Fink et al.

(10) Patent No.: US 10,406,723 B2
(45) Date of Patent: Sep. 10, 2019

(54) DYNAMIC IN-FIBER PARTICLE PRODUCTION WITH PRECISE DIMENSIONAL CONTROL

(71) Applicants: Massachusetts Institute of Technology, Cambridge, MA (US); University of Central Florida Research Foundation, Orlando, FL (US)

(72) Inventors: Yoel Fink, Brookline, MA (US); Ayman F. Abouraddy, Oviedo, FL (US); Benjamin Jean-Baptiste Grena, Cambridge, MA (US); Alexander Gumennik, Brookline, MA (US); John D. Joannopoulos, Belmont, MA (US); Guillaume R. Lestoquoy, Cambridge, MA (US); Lei Wei, Cambridge, MA (US)

(73) Assignees: University of Central Florida Research Foundation, Orlando, FL (US); Massachusetts Institute of Technology, Cambridge, MA (US)

(*) Notice: Subject to any disclaimer, the term of this patent is extended or adjusted under 35 U.S.C. 154(b) by 1011 days.

(21) Appl. No.: 14/210,359

(22) Filed: Mar. 13, 2014

(65) Prior Publication Data
US 2015/0044463 A1 Feb. 12, 2015

Related U.S. Application Data

(60) Provisional application No. 61/894,140, filed on Oct. 22, 2013, provisional application No. 61/780,857, filed on Mar. 13, 2013.

(51) Int. Cl.
*B29B 9/10* (2006.01)
*B22F 9/04* (2006.01)
(Continued)

(52) U.S. Cl.
CPC ............. *B29B 9/10* (2013.01); *B22F 9/04* (2013.01); *B29C 55/005* (2013.01); *C01B 33/02* (2013.01);
(Continued)

(58) Field of Classification Search
CPC ....... D01D 5/34; D01F 9/08; Y10T 428/2927; Y10T 428/2933; Y10T 428/296;
(Continued)

(56) References Cited

U.S. PATENT DOCUMENTS

| 4,371,838 A | 2/1983 | Griscom |
| 4,915,467 A * | 4/1990 | Berkey ................. C03B 23/04 385/43 |

(Continued)

FOREIGN PATENT DOCUMENTS

| JP | 08124438 A | 5/1996 |
| JP | 2001235609 A | 8/2001 |

(Continued)

OTHER PUBLICATIONS

Shabahang et al., Scalable fabrication of micro- and nano-particles utilizing the Rayleigh instability in multi-material fibers, May 13, 2011, Proc. of SPIE vol. 8031 . (Year: 2011).*

(Continued)

*Primary Examiner* — Queenie S Dehghan
(74) *Attorney, Agent, or Firm* — Theresa A. Lober

(57) ABSTRACT

A fiber is provided that has been thermally drawn from a fiber preform, having a longitudinal-axis length and including at least one core that has a longitudinal core axis parallel to the longitudinal axis and internally disposed to at least one outer fiber cladding material layer along the fiber length. The fiber is fed through a localized heating site having a heating site temperature, T, that is above a melting temperature of the fiber core, with a feed speed, $v_f$, that melts a portion of (Continued)

the fiber core at the heating site, causing molten droplets to pinch off of fiber core material, one droplet at a time, with a time period of molten droplet formation set by the fiber feed speed, $v_f$. The fiber is fed through the localized heating site to move the molten droplets out of the heating site and solidify the molten droplets into solid in-fiber particles.

19 Claims, 5 Drawing Sheets

(51) Int. Cl.
| | |
|---|---|
| D01F 9/08 | (2006.01) |
| B29C 55/00 | (2006.01) |
| C01B 33/02 | (2006.01) |
| D01D 5/34 | (2006.01) |
| C04B 35/628 | (2006.01) |
| B29K 105/16 | (2006.01) |
| B29L 9/00 | (2006.01) |
| B29L 31/00 | (2006.01) |

(52) U.S. Cl.
CPC ......... *C04B 35/62849* (2013.01); *D01D 5/34* (2013.01); *D01F 9/08* (2013.01); *B22F 2009/045* (2013.01); *B29K 2105/162* (2013.01); *B29K 2995/0005* (2013.01); *B29K 2995/0041* (2013.01); *B29L 2009/00* (2013.01); *B29L 2031/731* (2013.01); *Y10T 428/296* (2015.01); *Y10T 428/2927* (2015.01); *Y10T 428/2933* (2015.01); *Y10T 428/2982* (2015.01); *Y10T 428/2991* (2015.01)

(58) Field of Classification Search
CPC ......... Y10T 428/2982; Y10T 428/2991; B22F 2009/045; B29K 2105/162; B29K 2995/0005; B29K 2995/0041; B29L 2009/00; B29L 2031/731; C03B 23/047; C03B 37/075; C03B 37/0753; C03B 37/025; C03B 37/026; C03B 37/027
See application file for complete search history.

(56) References Cited

U.S. PATENT DOCUMENTS

| | | | |
|---|---|---|---|
| 5,110,334 A * | 5/1992 | Ayers | C03B 37/026 29/419.1 |
| 5,907,652 A | 5/1999 | DiGiovanni et al. | |
| 6,248,696 B1 | 6/2001 | Tuominen et al. | |
| 6,374,641 B1 | 4/2002 | Chu et al. | |
| 6,550,279 B1 | 4/2003 | Anderson et al. | |
| 6,645,893 B2 | 11/2003 | Miura et al. | |
| 6,723,435 B1 | 4/2004 | Horne et al. | |
| 7,295,734 B2 * | 11/2007 | Bayindir | B29D 11/00663 257/E31.093 |
| 7,354,871 B2 | 4/2008 | Lee et al. | |
| 7,485,799 B2 | 2/2009 | Guerra | |
| 7,514,600 B2 * | 4/2009 | Paknikar | B01J 13/0008 435/243 |
| 7,842,880 B2 | 11/2010 | Gazda | |
| 7,935,418 B2 | 5/2011 | Koops et al. | |
| 8,073,299 B2 * | 12/2011 | Taghizadeh | B82Y 20/00 385/115 |
| 8,404,174 B2 | 3/2013 | Nakanishi et al. | |
| 9,263,614 B2 | 2/2016 | Deng et al. | |
| 9,512,036 B2 | 12/2016 | Abourrady | |
| 10,112,321 B2 | 10/2018 | Gumennik et al. | |
| 2003/0026584 A1 | 2/2003 | Ingman et al. | |
| 2003/0232200 A1 | 12/2003 | Bryan et al. | |
| 2005/0019504 A1 | 1/2005 | Bi et al. | |
| 2005/0111805 A1 | 5/2005 | Hertz et al. | |
| 2007/0111493 A1 | 5/2007 | Lee et al. | |
| 2007/0131266 A1 | 6/2007 | Dutta | |
| 2007/0246713 A1 | 10/2007 | Arnold et al. | |
| 2009/0087899 A1 | 4/2009 | McKnight et al. | |
| 2011/0097581 A1 | 4/2011 | Deng et al. | |
| 2011/0098383 A1 | 4/2011 | Albert et al. | |
| 2012/0100374 A1 | 4/2012 | Zinn et al. | |
| 2013/0202888 A1 | 8/2013 | Abouraddy et al. | |
| 2015/0044463 A1 | 2/2015 | Fink et al. | |
| 2016/0060166 A1 | 3/2016 | Abouraddy et al. | |
| 2016/0340224 A1 | 11/2016 | Abouraddy et al. | |
| 2018/0039036 A1 | 2/2018 | Fink et al. | |

FOREIGN PATENT DOCUMENTS

| | | |
|---|---|---|
| JP | 2002104842 A | 4/2002 |
| JP | 200444035 A1 | 2/2004 |
| JP | 2007136661 A | 6/2007 |
| JP | 2009 133037 A | 6/2009 |
| JP | 2010119970 A | 6/2010 |
| WO | 200015548 A2 | 3/2000 |
| WO | 2004003268 A1 | 1/2004 |
| WO | 2012058314 A3 | 5/2012 |

OTHER PUBLICATIONS

PCT/US2011/057895, International Search Report, Form PCT/ISA/210 First sheet, Second sheet, and patent family annex, May 2012.
PCT/US2011/057895, Written Opinion of the International Searching Authority, Form PCT/ISA/237 cover Sheet, Box I sheet, Box V sheet, and Box V Sheet, May 2012.
Tao et al., "Multimaterial Fibers," International Journal of Applied Glass Science, vol. 3, No. 4, pp. 349-368, Nov. 2012.
Shabahang et al., "Observation of the Plateau-Rayleight capillary instability in multi-material optical fibers," Applied Physics Letters, vol. 99, No. 16, pp. 161909-1-161909-3, Oct. 21, 2011.
Kaufman et al., "Thermal Drawing of High-Density Macroscopic Arrays of Well-Ordered Sub-5-nm-Diameter Nanowires," Nano Letters, vol. 11, pp. 4768-4773, Oct. 3, 2011.
Orf et al., "Fiber draw synthesis," PNAS, vol. 108, No. 12, pp. 4743-4747, Mar. 2011.
Deng et al., "In-Fiber Semiconductor Filament Arrays," NANO Letters, vol. 8, No. 12, pp. 4265-4269, Oct. 2008.
Deng et al., "Processing and properties of centimeter-long, in-fiber, crystalline-selenium filaments," Applied Physics Letters, vol. 96, pp. 023102-1-023102-3, Jan. 2010.
Deng et al., "Exploration of in-fiber nanostructures from capillary instability," Optics Express, vol. 19, No. 17, pp. 16273-16290, Aug. 2011.
Kaufman et al., "Structured spheres generated by an in-fibre fluid instability," Nature, vol. 487, No. 7408, pp. 163-467, Erratum p. 1, Jul. 2012.
Kaufman et al., "In-fiber fabrication of size-controllable structured particles," CLEO: Science and Innovations 2012, Conference on Lasers and Electro-Optics,Technical Digest, CM4L.6 pp. 1-2, San Jose, CA, May 2012.
Liang et al., "Linear stability analysis of capillary instabilities for concentric cylindrical shells," J. Fluid Mech., vol. 683, pp. 235-262, Aug. 2011.
Shabahang et al., "Scalable fabrication of micro- and nano-particles utilizing the Rayleigh instability in multi-material fibers," Micro- and Nanotechnology Sensors, Systems, and Applications III, Proc. of SPIE vol. 8031, pp. 80132O-1-80132O-7, May 2011.
PCT/US2013/046694, International Search Report, Form PCT/ISA/210 First sheet, Continuation of first sheet (2), Second sheet, and further information continued from PCT/ISA/210, Apr. 2015.
PCT/US2013/046694, Written Opinion of the International Searching Authority, Form PCT/ISA/237 cover Sheet, Box I sheet, Box III sheet, Box IV and Box V sheet, and Separate Sheet, sheets 1-3, Apr. 2015.
PCT/US2014/26902, International Search Report, Form PCT/ISA/210 First sheet, Continuation of first sheet (2)-(3), Second sheet, and extra sheet, Jan. 2015.
PCT/US2014/26902, Written Opinion of the International Searching Authority, Form PCT/ISA/237 cover Sheet, Box I sheet, Box IV

(56) References Cited

OTHER PUBLICATIONS sheet, Box V sheet, and 5 Supplemental Box sheets, Jan. 2015.
PCT/US2014/26867, International Search Report, Form PCT/ISA/210 First sheet, Continuation of first sheet (2), Second sheet, continuation of second sheet, and extra sheet, Sep. 2014.
PCT/US2014/26867, Written Opinion of the International Searching Authority, Form PCT/ISA/237 cover Sheet, Box I sheet, Box IV sheet, Box V sheet, Box VII sheet, and 9 Supplemental Box sheets, Sep. 2014.
Abouraddy, "Multi-Material fibers: Prospects for photonics, energy, and biotechnology," Presentation at the MSE Seminar Colloquium Series, Division of Materials Science and Engineering, Boston University, Slides 1-69, Boston, MA Feb. 22, 2013.
Abouraddy et al., "Using in-fiber fluid instabilities for the scalable production of structured spherical particles," Presentation at 65th Annual Meeting of the APS Division of Fluid Dynamics, Slides 1-11, San Diego, CA, Nov. 18-20, 2012.
Yang et al., "Fabrication of chalcogenide microspheres," PNCS International Conference on the Physics of Non-Crystalline Solids (XIII PNCS), Staff Poster Abstracts p. 94, Hubei, CN, Sep. 16-20, 2012.
Japanese Patent Appl. No. 2013-536781, Summary of JP Office Action, pp. 1-4, Oct. 2014.
Japanese Patent Appl. No. 2013-536781, Response to JP Office Action, Jan. 2015.
Japanese Patent Appl. No. 2013-536781, JP Office Action, Aug. 2015.
Japanese Patent Appl. No. 2013-536781, Response to JP Office Action, Sep. 2015.
Shabahang et al., "Observation of the Rayleight-Plateau Instability in the Core of a Multi-Material Optical Fiber During Tapering," Presentation at OSA FiO, Slides 1-18, Rochester, NY, Oct. 16-20, 2010.
Kaufman et al., "Polymer Fibers for Nano-Particle Fabrication and Solar Energy Capture," Presentation at Workshop on Next-Generation Optical Fiber Technology, Slides 1-5, Cocoa Beach, FL, Oct. 18, 2010.
Abouraddy, "Surprises in the Fabrication of Multi-Material Fibers," Presentation at Workshop on Next-Generation Optical Fiber Technology, Slides 1-33, Cocoa Beach, FL, Oct. 18, 2010.
Abouraddy, "Surprises in the Fabrication of Multi-Material Fibers," Presentation at the Center for Optical Materials Science and Engineering Technologies (COMSET), Clemson University, Slides 1-67, Nov. 3, 2011.
Abouraddy, "Multi-Material Optical Fibers: Fabrication and Applications," Presentation at SPIE Defense, Security, and Sensing Conference 2011, Slides 1-50, Apr. 25-29, 2011.
Shabahang et al., "Scalable fabrication of micro- and nano-particles utilizing the Rayleigh instability in multi-material Fibers," Presentation at SPIE Defense, Security, and Sensing Conference 2011, Slides 1-10, Apr. 25-29, 2011.

Kaufman et al., "Scalable fabrication of micro- and nano-particles utilizing the Rayleigh instability in multi-material Fibers," Presentation at TechConnect World, Nanotech 2011, slides 1-10, Boston, MA, Jun. 13-16, 2011.
Yang et al, "Fabrication of chalcogenide microspheres," Poster at 11th Annual Center for Ultrahigh Bandwidth Devices for Optical Systems (CUDOS) Workshop, New South Wales, AU, Jan. 31-Feb. 3, 2012.
Kaufman et al., "In-fiber fabrication of size-controllable structured particles," Presenatation at OSA Advanced Photonics Congress, Specialty Optical Fibers & Applications (SOF) Topical Meeting, Slides 1-26, Colorado Springs, CO, Jun. 17-21, 2012.
Shukla et al., "Mechanisms of room temperature metastable tetragonal phase stabilisation in zirconia," Int. Mater. Rev., vol. 50, No. 1, pp. 1-20, Feb. 2005.
Cukrov et al., "$SnO_2$ Nanoparticles Prepared by Mechanochemical Processing," Scripta Mater., vol. 44, No. 8/9, pp. 1787-1790, May 2001.
Ninterer et al., "Phase stability in nanostructured and coarse grained zirconia at high pressures," NanoStructured Mater., vol. 5, No. 6, pp. 679-688, Jun. 1995.
Kaufman et al., "Multimaterial Fibers for Generating Structured Nanoparticles," Adv. Photonics Conf., Washington, D.C., pp. STu2F. 6, Jan. 2012.
Ballato et al., "Glass-clad single-crystal germanium optical fiber," Optics Express, vol. 17, No. 10, pp. 8029-8035, May 2009.
Ballato et al., "Silicon optical fiber," Optics Express, vol. 16, No. 23, pp. 18675-18683, Nov. 2008.
Morris et al., "On loss in silicon core optical fibers," Optical Materials Express, vol. 2, No. 11, pp. 1511-1519, Nov. 2012.
Morris et al., "Reactive molten core fabrication of silicon optical fiber," Optical Materials Express, vol. 1, No. 6, pp. 1141-1149, Oct. 2011.
Tao, "Multimaterial fibers in photonics and nanotechnology," PhD Dissertation, The College of Optics and Photonics, University of Central Florida, Orlando, Florida, pp. i-94, Jun. 2014.
EP patent application No. 14813664.1-1371, Communication p. 1 of 1, Supplemental EP Search Report, pp. 1-2, Lack of unity of invention sheet 1 and Sheet B pp. 1-2, Annex sheet, Examination Sheets 1-8, Info. on search strategy, Feb. 2017.
EP patent application No. 14813664.1-1371, Response to EP Communication, pp. 1-6, claims with amendments, pp. 1-7, Oct. 2017.
EP patent application No. 14813664.1-1371, EP Communication of intention to grant, Sheets 1-5, Annex sheet 1-2, Description pp. 1-35, claims pp. 1-3, Drawings sheets 1-5, Feb. 2018.
JP patent application No. 2016-502275, JPO Summary and Notice English-language, sheets 1-2, Japanese language, sheets 1-4, Jan. 2017.
JP patent application No. 2016-502275, Claim amendments filed in response to JPO Summary and Notice, pp. 1-8, Apr. 2017.

* cited by examiner

US 10,406,723 B2

DYNAMIC IN-FIBER PARTICLE PRODUCTION WITH PRECISE DIMENSIONAL CONTROL

CROSS-REFERENCE TO RELATED APPLICATIONS

This application claims the benefit of U.S. Provisional Patent Application No. 61/780,857, filed Mar. 13, 2013, and claims the benefit of U.S. Provisional Patent Application No. 61/894,140, filed Oct. 22, 2013, the entirety of both of which U.S. Provisional patent applications are hereby incorporated by reference.

STATEMENT REGARDING FEDERALLY SPONSORED RESEARCH

This invention was made with Government support under Contract No. DMR-0819762, awarded by the National Science Foundation and under Contract No. W911NF-07-D-0004, awarded by the Army Research Office. The Government has certain rights in the invention.

BACKGROUND

This invention relates generally to techniques for particle fabrication, and more particularly relates to the production of microparticles and nanoparticles.

Known so-called 'bottom-up' approaches for forming particles, such as nanoparticles, generally rely on nucleation, chemical reactions, or self-assembly processes. The particles produced using such approaches are typically characterized by a large dispersion in size and shape distributions, and are generally hampered by particle coalescence and agglomeration during particle growth. Conversely, so-called 'top-down' approaches, such as microfluidics, lithography, and imprint lithography, typically yield larger, mono-disperse particles, but each such approach is generally suited only to a specific material and particle size range that is determined by the underlying kinetics of the process.

SUMMARY

The many limitations of prior approaches for forming particles are overcome with a method for forming particles that employs a fiber. In the method for producing particles, a fiber is provided that has been thermally drawn from a fiber preform. The fiber has a longitudinal-axis fiber length and includes at least one fiber core that has a longitudinal core axis parallel to the longitudinal fiber axis and that is internally disposed to at least one outer fiber cladding layer of cladding material along the fiber length. The fiber is fed through a localized heating site having a heating site temperature, T, that is above a melting temperature of the fiber core. The fiber is fed at a fiber feed speed, $\upsilon_f$, that melts a portion of the fiber core at the localized heating site, causing molten droplets to pinch off of fiber core material from the fiber core portion, one droplet at a time, with a time period of molten droplet formation set by the fiber feed speed, $\upsilon_f$. The fiber is continued to be fed through the localized heating site to move the molten droplets out of the localized heating site and solidify the molten droplets.

In a further methodology there is applied to a fiber a moving thermal gradient having a heating temperature, T, that is above a melting temperature of the fiber core. The moving thermal gradient has a speed, $\upsilon_f$, that melts a portion of the fiber core at a localized heating site, causing molten droplets to pinch off of fiber core material from the fiber core portion, one droplet at a time, with a time period of molten droplet formation set by the speed, $\upsilon_f$. Thereafter, the molten droplets are solidified.

With these methods there is produced a longitudinal sequence of solid particles in the fiber, parallel to the longitudinal fiber axis. Each particle is separated from other particles in the sequence by the fiber cladding material. A resulting fiber thereby can include silica cladding along a longitudinal-axis fiber length, with a plurality of crystalline particles disposed as a sequence along a longitudinal line parallel to the longitudinal fiber axis in at least a portion of the fiber length. Each crystalline particle is embedded in the silica cladding material This particle formation method enables the controllable and scalable production of complex and well-defined micro-scale and nano-scale structures that are well-ordered, controllably oriented, and immobilized. An enormous range of applications, e.g., from the fields of chemistry, physics, and biology, are addressed by the particle formation. For example, three-dimensional optical and acoustic meta-materials can be produced, optical-resonance-based sensitive detection of chemical species and pathogens can be enabled, and sophisticated controlled-release drug delivery systems can be realized. Many applications requiring precisely controlled particle formation can be enabled in a cost-effective and well-controlled environment. Other features and advantages will be apparent from the following description and accompanying figures, and from the claims.

DETAILED DESCRIPTION

In the method provided herein for producing particles in a fiber, a fiber that has been previously produced, for example by thermal drawing of a fiber preform into a fiber, is processed in a post-draw heating step. The drawn fiber has a longitudinal-axis fiber length and includes one or more elongated internal regions, here referred to as fiber core regions, that each have a longitudinal axis parallel to the longitudinal fiber axis and that extend along at least a portion of the fiber length. The internal elongated fiber core regions can be disposed at any suitable radial and circumferential position within the fiber. The drawn fiber includes at least one cladding region that circumferentially surrounds each elongated internal fiber core region.

Figure 1:
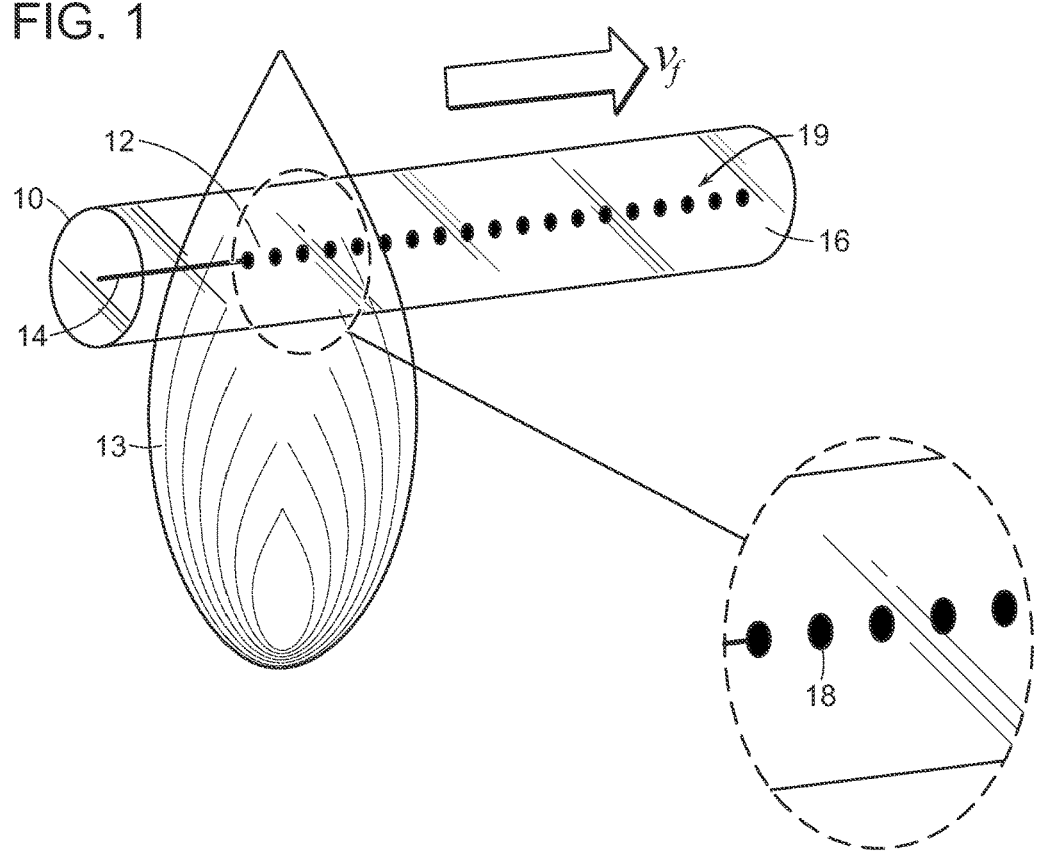
FIG. 1 is a schematic perspective view of a fiber undergoing a first example in-fiber particle formation process provided herein.

Referring to FIG. 1, in the post-draw heating step, there is imposed a temporally dynamic thermal gradient, or moving thermal gradient, along the longitudinal fiber axis. In one example of such, the fiber 10 is longitudinally fed through a spatially localized heating site 12 at a controlled fiber feed speed, $v_f$. In FIG. 1, the localized heating site 12 is represented as the hot spot of a flame 13, but any suitable heating source can be employed, including a resistance heating element, such as a tungsten wire. As the fiber is fed into the spatially localized heating site 12, one or more of the elongated internal fiber core regions 14 soften, melt, and become molten after passing into the localized heating site 12. Specifically, a portion, such as the tip, of a solid internal core region 14, after arriving at the heating site, becomes molten and is subject to capillary instability that causes a portion of the molten core region 14 core to pinch off into a spherical molten droplet in order to reduce its surface energy. As the spherical molten droplet moves out of the localized heating site while the fiber feed is continued, the droplet solidifies, becoming a solid particle 18 that is embedded in the solidified cladding 16 of the fiber 10. During the droplet and particle formation process, the cladding material softens and flows around the spherical molten droplet and then hardens with the particle.

By continuously feeding the fiber through the localized heating site, a sequence, or string, of spherical molten droplets 18 are formed in the fiber and solidify into particles. The droplets are formed one-by-one, i.e., pinch off one at a time from an end of an elongated molten fiber core region at regular intervals, with a time period of particle formation that is set by the fiber feed speed. With this one-by-one particle formation, one additional particle is periodically added to the end of a sequence 19 of particles in the cladding 16 of the fiber, with the particle spacing in the string having a corresponding periodicity. The cladding 16 separates each particle from the others in the string, so that there is no agglomeration of particles in the fiber.

As explained in detail below, the dynamic heating of the fiber and fiber core region enables precise control of particle dimensions and spacing in the fiber, and produces a particle population having high uniformity. The particles can be produced over an extremely broad range of particle dimension, from millimeters to nanometers, e.g., less than one micron and less than 100 nanometers for any suitable material, including material compounds, and in a range of morphologies including amorphous and crystalline materials, and in a wide range of particle geometries, including spherical, elliptical, and other geometries. No particular localized heating site arrangement is required; a moving thermal gradient can be applied along a stationary fiber or a fiber can be fed through a stationary localized heating site in the manner described above. Either scenario can be employed in a wide range of fiber configurations.

Figure 2:
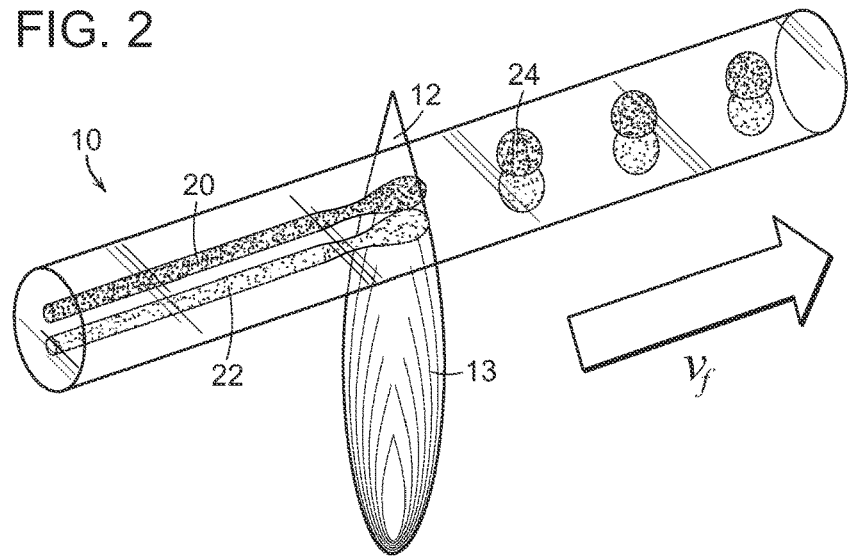
FIG. 2 is a schematic perspective view of a fiber undergoing a second example in-fiber particle formation process provided herein.

For example, as shown in FIG. 2, a fiber 10 to be processed for producing in-fiber particles can include any suitable number of elongated internal core regions 20, 22, for producing particles within the fiber 10. For example, two elongated core regions 20, 22 can be provided in the fiber, termed fiber cores herein for clarity, but not limited to a particular size or position within the fiber. When a fiber including such cores is temporally dynamically fed into a spatially localized heating site 12, the tip of each of the two or more core regions 20, 22, breaks off into a spherical molten droplet, and under suitable conditions, as explained below, can coalesce with other spherical molten droplets to form multi-particle clusters 24. In this way, as described in detail below, multiple material regions of a fiber can be joined into particles produced within the fiber.

Figure 3:
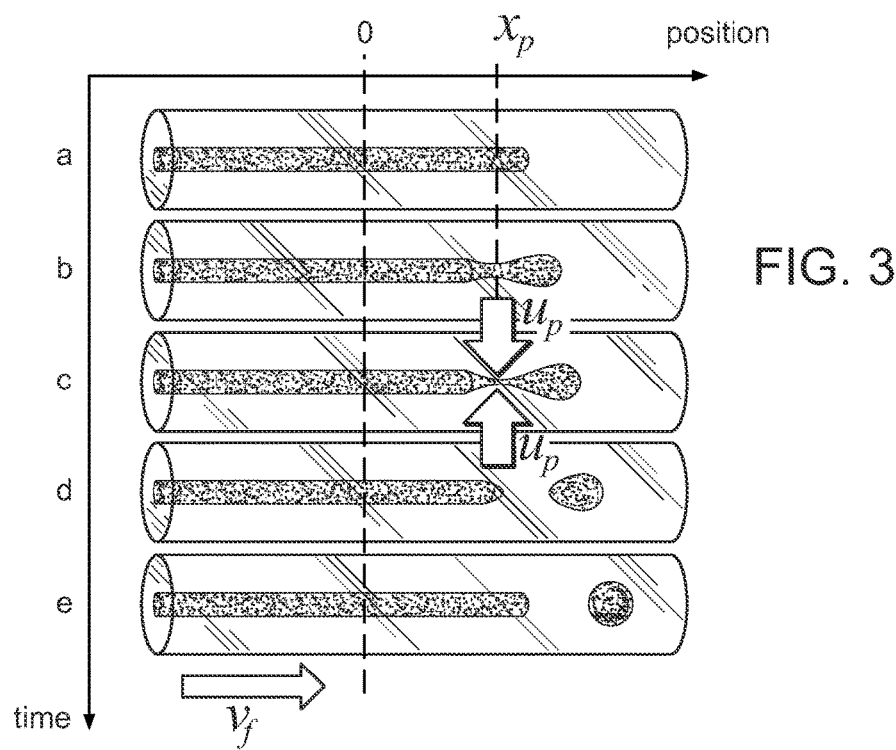
FIG. 3 is a chart schematically representing the five stages of in-fiber particle formation.

For any particle geometry, in the dynamic particle formation process, in general, the fiber velocity, $v_f$, at which the fiber is dynamically introduced to a localized heating site controls the size of the particles that are formed in the fiber; the slower the feed speed, the smaller the particle diameter. One analogy that represents this phenomenon is the use of flow rate to control droplet formation in a dripping water faucet. Referring to FIG. 3, there is schematically represented the particle formation process at five stages of the process, labeled stage (a) through stage (e), with the formation of one particle depicted. The position x=0 represents the melting front of the solid tip portion of an elongated core region internal to a fiber as that portion of the core region enters a localized heating site. A spherical particle detaches from the tip portion of the melted fiber core region at a fixed location within the heating site, designated as the pinch-off point, $x=x_p$, that is a distance, x, from the entry into the heating site. The diameter, d, of the spherical particle is determined by a competition between the fiber feed speed, $v_f$, and the velocity, $u_p$, of the interface between the fiber cladding material and the internal elongated fiber core region, and causes pinching off of a molten particle at the location, $x_p$.

The cladding-core interface velocity, $u_p$, can be analyzed with dimensional analysis and scaling of the governing fluid mechanics equations for the dynamic heating process. Fluid flow in the fiber system is predominantly forced by interfacial tension between a core region and cladding region, and therefore the relevant boundary condition to be considered is the normal stress balance at the interface between the fiber cladding material and the internal elongated core region, which can be expressed as:

$$n \cdot T^{clad} \cdot n - n \cdot T^{core} \cdot n = \gamma (\nabla \cdot n), \tag{1}$$

where $T^{clad}$ and $T^{core}$ are the stress tensors in the fiber cladding and the elongated internal fiber core region, respectively, and $\gamma$ is the core/clad interfacial tension. The components of the stress tensor in core region, $T_{ij}^{core}$, can be given as:

$$T_{ij}^{core} = -p^{core}\delta_{ij} + \mu^{core}\left(\frac{\partial v_i}{\partial x_j} + \frac{\partial v_j}{\partial x_i}\right), \tag{2}$$

where $v_i$ are the components of the velocity field in the core region, and $p^{core}$ is the pressure field in the elongated fiber core region. A similar expression holds for the fiber cladding. Assuming low-Reynolds number flows in both the fiber cladding and the internal fiber core region, and noting that the characteristic length scale in the problem is the internal elongated core diameter, D, it is concluded that the characteristic pressures at the droplet pinch-off location are $$p^{core} \sim \frac{2\mu_p^{core}}{D} \cdot u_p \text{ and } p^{clad} \sim \frac{2\mu_p^{core}}{D} \cdot u_p,$$

respectively, in the elongated core region and the fiber cladding. The stress balance condition can therefore be rewritten as:

$$(\mu_p^{clad} - \mu_p^{core})\frac{u_p}{D} \sim \frac{\gamma_p}{D}. \quad (3)$$

For most materials, in which for all practical temperatures, $\mu_p^{clad} \gg \mu_p^{core}$, an expression for $u_p$ can therefore be given as:

$$u_p \sim \frac{\gamma_p}{\mu_p^{clad}}, \quad (4)$$

where $\mu_p^{clad}$ is the local viscosity of the cladding material, and the core/clad interfacial tension is given as $\gamma_p$ at $x=x_p$. This interfacial tension is what drives the core portion pinching-off into droplets with a pinching-off velocity $u_p$.

With this relation, there then can be define a length, $\lambda_d$, that is the length of internal fiber core portion fed into the localized heating site during a time $$\frac{D}{2u_p}$$

needed for the core tip portion to pinch-off, where D is the diameter of the core, and thus $$\lambda_d \approx v_f \frac{D\mu_p^{clad}}{2\gamma_p}.$$

This expression seemingly implies a linear scaling of $\lambda_d$ with $v_f$, but in reality, $x_p$ depends on the fiber feed speed: as the fiber feed speed, $v_f$ is increased, pinch-off of a molten droplet from the end portion of the core region occurs further into the heating site, where the higher temperature in turn yields faster pinching speeds.

Thus, while the exact relationship between core diameter and fiber speed can be complicated, for most applications there can be employed an approximate relationship that enables the controlled production of particle dimensions that are a priori specified for a given application be setting the fiber feed speed, $v_f$, into a localized heating site. Given a prespecified spherical particle diameter, d, to be produced in a fiber including a fiber core region having a core region diameter, D, then the particle diameter d, can be attained by imposing a relationship for d as:

$$d = \sqrt[3]{\frac{3}{2}\lambda_d \cdot D^2} \approx D \cdot \sqrt[3]{\frac{3}{4}v_f \frac{\mu_p^{clad}}{\gamma_p}}, \quad (5)$$

where $\mu_p^{clad}$ is the local viscosity of the fiber cladding material at the selected temperature of the localized heating site and $\gamma_p$ is the interfacial tension between the core material and the cladding material.

With this relationship, the parameters of the fiber/core system and localized heating site can be manipulated to precisely produce a selected particle diameter that can be repeatedly and uniformly obtained across a large particle population. Considering each of the factors, only the local viscosity, $\mu_p^{clad}$ of the fiber cladding material is significantly dependent on the heating site temperature. In turn, the heating site temperature is generally selected based on the choice for particle material. The heating site temperature is preferably some temperature above that temperature which melts the fiber core material to enable formation of molten droplets from the fiber core in the fiber cladding. But the heating site temperature is also preferably below that temperature at which the viscosity of the fiber cladding material would be too low to maintain structural integrity during the particle formation process.

Figure 4:
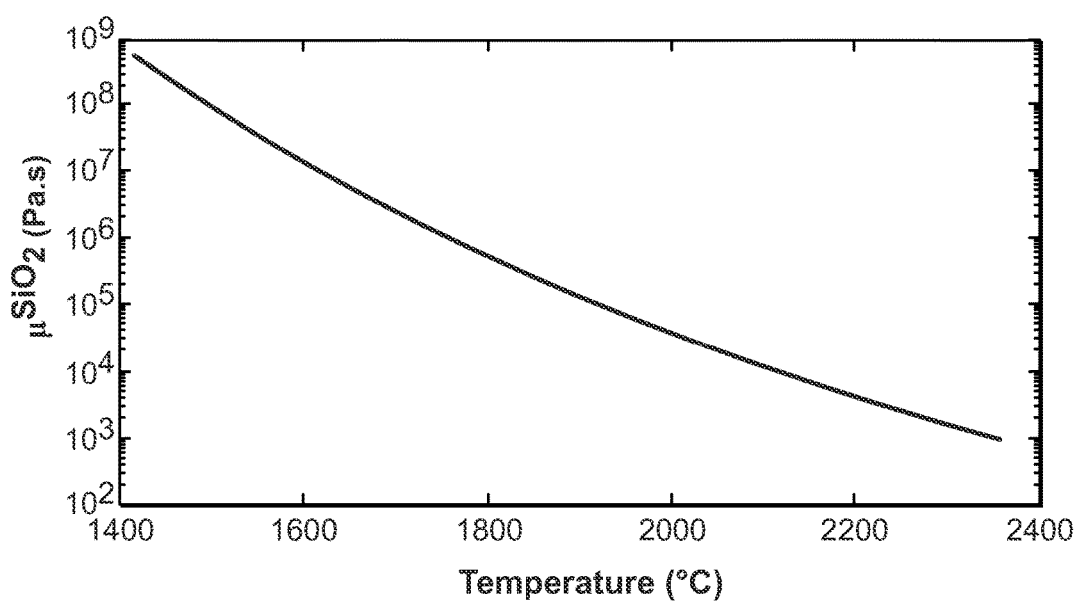
FIG. 4 is a plot of the viscosity of silica as a function of temperature for a range of temperatures between the melting point and the boiling point of silicon.

It therefore can be instructive to investigate the range of localized heating site temperatures for which a given core material would melt to determine that range of heating site temperatures for which the cladding material viscosity would be best-suited for the particle formation, and therefore to determine the cladding viscosity at the heating site temperature. Referring to FIG. 4, in one example of such an investigation, there is considered a fiber system in which a silica fiber cladding material and a silicon core internal to the silica fiber cladding are provided for producing in-fiber silicon particles. In FIG. 4 there is plotted the viscosity of the silica fiber cladding material as a function of temperature between the silicon melting temperature, 1,414° C., and the silicon boiling temperature, 2,357° C. Above a temperature of about 2,200° C., the silica viscosity is found to be too low to support particle formation within a silica fiber structure. Below a temperature of about 1,600° C. the silica viscosity is too high to accommodate silica flow between the formed particles as each particle is formed. A localized heating temperature of between about 1,600° C. and about 2,200° C. can therefore be set as an optimum temperature range, and the viscosity of the silica specified for that temperature within the range that is ultimately selected for the particle formation. The viscosity of suitable cladding materials for a range of temperatures can in general be found in scientific literature, or can be determined for a selected cladding material experimentally. Fiber cladding materials other than silica, including, e.g., silicates, borosilicates, phosphate glasses, and soda lime glass, and other suitable materials, can be employed.

In Expression (5) above, the interfacial tension between the fiber cladding and core material, $\gamma_p$, is not significantly dependent on temperature, and therefore for most applications, can be specified as a constant over the range of possible particle formation temperatures. For example, in the silica/silicon fiber cladding/fiber core example just discussed, an interfacial tension of about 1.5 J/m² can be assumed for the range of possible particle formation temperatures. With the interfacial tension and cladding viscosity thus specified, the fiber speed, $v_f$, that is required to produce a preselected particle diameter, d, for a given fiber core diameter, D, is determined from Expression (5) above.

Thus, with this control methodology, the control of the speed, $v_f$, of a moving thermal gradient across a fiber, by dynamically exposing a fiber to a spatially-localized heating site, or moving the fiber through a localized heating site, enables direct control of the diameter of spherical particles produced in the fiber, independent of the heating site temperature. This is much more practical than requiring a temperature variation in an effort to control the system viscosity and corresponding particle diameter. The temperature is here controlled only to enable particle formation in general, and is not size-specific. Further, this speed-controlled process enables the production of spherical particles in a much wider range of possible particle diameters, and particular diameters that are much smaller, than those that could be produced by uniformly heating a length of fiber. As explained above, the fiber speed into the thermal gradient, or the thermal gradient speed along the fiber, sets the spherical particle diameter along with the fiber material characteristics. In a process of uniformly heating a length of fiber, spontaneous and random spatial breakup of a fiber core results in the simultaneous production of a plurality of spherical particles along the fiber length to form a chain of spherical particles, and the core diameter and temperature thereby sets the particle diameter.

In contrast, in the present methodology, for a given fiber core diameter and heating temperature, the spherical particle diameter can be further controlled because the particle formation is one-by-one at the tip portion of the core material, not spontaneous along a length of core material. As a result, with sufficiently slow fiber speed, there can be produced spherical particles having a much smaller diameter than those obtained by uniform heating, for a given core diameter. The heating methodology herein can therefore be applied to fibers with a wide range of internal core diameters to yield in-fiber spherical particles as small as nanometer-sized particles as well as millimeter-sized particles. For any size in this wide range of diameters, the spherical particle production methodology is so well-controlled that a very high degree of reproducibility is achieved along a sequence of particles in a fiber, whereby the distribution of particle diameters in a sequence of particles produced in a fiber length can be substantially monomodal. Further, the particles in a sequence need not be substantially spherical, and instead can be elliptical or have another selected geometry. The longest extent of the particle is less than the outer diameter of the fiber, but can take on a range of geometries.

The in-fiber particles can be formed of any suitable single material, compound material, composite material, or other selected material, but preferably are formed of materials that can be compatibly heated together with the cladding material in the localized heating site, with the cladding material maintaining structural integrity while softening to flow between the particles as the core material becomes molten for pinch-off of a molten droplet at the heating site. In addition, to enable the core material melting and droplet formation in a reasonable time duration, it can be preferred that the core and cladding interface be characterized by a significant interface energy at the localized heating site temperature. Further, it can be preferred that the cladding and core materials be co-drawn into a fiber from a fiber preform with a corresponding fiber cladding material, and therefore should also be thermally compatible for fiber preform drawing. Cladding materials can include polymers, oxides, silica, glassy materials, borosilicates, silicates, phosphate glasses, and soda lime glass, and other suitable materials, including thermoplastics and other compatible materials.

Example particle materials that are particularly well-suited for electronic applications include semiconducting materials, both amorphous and crystalline, including polycrystalline and monocrystalline, and including, for example, chalcogenide glasses, crystalline semiconductors such as Si and Ge, II-VI materials such as ZnSe, ZnS, CdTe, III-V materials such as GaAs, GaSb, AlGaAs, InSb, InP, InAs, or other suitable semiconducting materials can be employed as fiber core materials. In general, crystalline semiconducting materials, whether polycrystalline or monocrystalline, can be employed for producing polycrystalline or monocrystalline semiconducting particles. Electrically conducting materials such as gold, tin, silver, indium, bismuth, cadmium, lithium, or other electrically conducting material, such as alloys, compounds, and amorphous glassy metals, can be included in a fiber preform for producing particles. Insulating materials, such as polymers, oxides, silica, other glasses, and other materials can also be included in the fiber preform as core materials for producing particles of such materials.

Whatever materials are provided in the fiber preform, the materials preferably are thermally and mechanically compatible for co-drawing, and are thermally and mechanically compatible for particle production. For co-drawing, glassy and insulating materials should have compatible viscosities at the fiber draw temperature of interest, for example having a viscosity that is less than about $10^6$ Poise at a fiber draw temperature while maintaining the material integrity of the materials, whereby the materials are above their respective softening points at an overlapping draw temperature to enable co-drawing. The materials need not have the same viscosity at the draw temperature, but rather should flow at that common temperature. Metals and crystalline materials should melt at a temperature below the fiber draw temperature.

With these considerations, there can be identified a wide range of companion materials that can be paired as fiber cladding and fiber core region for producing particles from the fiber core region. Table I below lists several example material pairs and for each pair identifies a range of heating site temperatures and fiber feed speed velocities, $v_f$, that can be employed for producing particles in a range of particle diameters. These example temperature ranges and feed speeds are based on the consideration given above for enabling melting of the core material while maintaining sufficient viscosity of the cladding material. The example fiber feed speeds represent the ability to form a wide range of particle sizes.

TABLE I

| Fiber Core Material | Fiber Clad Material | Heating Site Temperature | Fiber Feed speed, $v_f$ |
| --- | --- | --- | --- |
| Silicon | Silica | >1600° C., <2230° C. | 1 µm/s-1 mm/s |
| Germanium | Silica | >1600° C., <2230° C. | 1 µm/s-1 mm/s |
| Copper | Silica | >1600° C., <2230° C. | 1 µm/s-1 mm/s |
| Gold | Silica | >1600° C., <2230° C. | 1 µm/s-1 mm/s |
| Platinum | Silica | >1768° C., <2230° C. | 1 µm/s-1 mm/s |
| GaSb | Silica | >1600° C., <2230° C. | 1 µm/s-1 mm/s |
| $Se_{97}S_3$ | PSU | ~285° C. | 1 µm/s-100 µm/s |
| $As_2Se_3$ | PES | 265-285° C. | 1 µm/s-100 µm/s |
| AMTIR 4 glass | Polycarbonate | ~250° C. | 1 µm/s-100 µm/s |
| Cyclo-olefin Polymer (COP) | PSU (polysulfone) | ~320° C. | 1 µm/s-100 µm/s |

Figure 5:
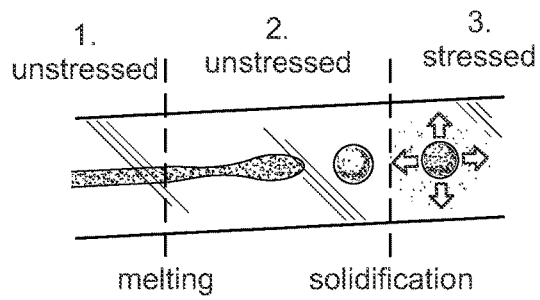
FIG. 5 is a schematic perspective view of a particle during in-fiber particle formation, illustrating a condition of pressure at the site of the in-fiber particle.

As explained above, for any particle size, after a molten particle forms from the end of a fiber core at a localized heating site, the molten particle solidifies and the fiber cladding solidifies, entrapping the particle in the cladding material. Referring to FIG. 5, this solidification is illustrated in conjunction with the melting of the fiber core tip. In a first phase (1), the tip of the core is melted at the heating site; here the fiber core material is mechanically unstressed. In a second phase (2), at the heating site, a molten droplet forms within a softened fiber cladding material; here the fiber core material is also mechanically unstressed. In a third phase (3), out of the heating site, the particle solidifies in the fiber cladding. Depending on the material composition of the particle and the material composition of the fiber cladding, the solidifying particle may physically contract or may physically expand against either soft or stiff cladding material.

As shown in FIG. 5, in a case of physical expansion during solidification of a particle, and for a scenario in which the solidification temperature of the core material is lower than the softening point of the cladding material, the fiber cladding forms a hermetic vessel around the particle as the cladding hardens, which generally occurs prior to particle solidification, so that the expanding particle presses against the hardened cladding and generates a high pressure condition internal to the fiber. To estimate the resulting internal pressure that is within a solidified spherical particle, there can be specified a homogeneous hydrostatic stress having a pressure, P, given as:

$$P = \frac{4K_S G_M}{3K_S + 4G_M} \alpha, \quad (6)$$

where $K_S$ is the bulk modulus of a solid spherical particle material, $G_M$ is the shear modulus of the fiber cladding material, and $\alpha$ is given as:

$$\alpha = \frac{V_{solid}}{V_{liquid}} - 1 = \frac{\rho_{liquid}}{\rho_{solid}} - 1, \quad (7)$$

where $\rho_{solid}$ and $\rho_{liquid}$ are the free-space densities of the particle material in the solid phase and in the liquid phase, respectively. It is noted that these expressions are independent of particle size, and therefore, the ability to develop particle-induced pressure in a fiber is not limited to a particular particle size regime.

Based on these Expressions (6) and (7), there can be estimated the internal pressure, P, that is generated by a particle produced in a fiber for selected particle and fiber cladding materials. It is discovered herein that for a selected particle material, there can be produced in the fiber, at the site of a particle, heretofore unachievable levels of pressure for particles in the millimeter to nanometer scale. For example, for a fiber including silica cladding and silicon particles formed from a silicon core in the fiber, there can be produced at the site of a silicon spherical particle a pressure of $P_{Si\text{-}particle}$=2.9 GPa, with $\alpha$=0.1, $K_{Si}$=98 GPa, and $G_{SiO_2}$=31 GPa. For a fiber including silica cladding and germanium particles formed from a germanium core in the fiber, there can be produced at the site of a germanium spherical particle a pressure of $P_{Ge\text{-}particle}$=1.5 GPa, with $\alpha$=0.055 and $K_{Ge}$=75 GPa. Similarly, gallium, antimony and bismuth and alloys of such expand upon solidification to producing particles having internal pressure. Other materials, including carbon and carbon-based materials likewise can be employed, to produce high-pressure carbon-based particles. In another example, with a fiber including silica cladding and an antimony core in the fiber, there can be produced antimony spherical particles in the fiber having an internal particle pressure of $P_{Sb\text{-}particle}$=0.62 GPa, with $\alpha$=0.036 and $K_{Sb}$=42 GPa.

These examples demonstrate that a prespecified, selected level of internal particle pressure, greater than 0.1 GPa, and even greater than 1 GPa or 2 GPa, can be achieved in a produced particle at in-fiber particle locations by corresponding selection of fiber cladding material and selection of in-fiber particle material. The in-fiber pressure is produced in a controlled and repeatable manner at specific, localized sites in the fiber. Thus, with the production of a string of solidified particles along a length of fiber, there is produced a corresponding string of discrete, disconnected high-stress domains along the fiber length, each consisting of an internal pressure of at least about 0.1 GPa. Each high-stress domain location and the periodicity of the domains along the fiber length are set by the fiber speed into the localized heating site for particle production. As a result, the fiber high-stress domains provide a spatially well-defined pressurized environment.

In addition, multiple parallel sequences of high-stress domains can be produced in a fiber with the inclusion of multiple fiber cores in a drawn fiber in the manner described above. Each fiber core can be simultaneously melted into a sequence of molten droplets that solidify into high-internal pressure particles along the sequence. Each such sequence can have a different particle material and therefore a different internal particle pressure. The population of particles that is released from the fiber thereby can include particles having a range of internal particle pressures.

Thus, with selected materials, a string, or sequence, of in-fiber pressure domains each of heretofore unachievable in-fiber pressures can be produced. Each domain pressure can be provided as at least about 0.1 GPa or more, and for many crystalline particle materials, such as silicon and germanium, a domain pressure of greater than 1 GPa or 2 GPa can be produced. This pressure can be achieved with a priori specification of the pressure domain size and location along a fiber, and thereby provides a scalable and particularly elegant approach for producing selected pressure conditions. These selected particle pressure conditions are retained upon removal of the produced particles from a fiber cladding material. The resulting free-standing particles have the internal pressure developed during the particle solidification stage, and can have an internal pressure of 0.1 GPa, and even greater than 1 GPa or 2 GPa. This high level of pressure cannot be achieved for fiber cladding materials that do not possess a sheer modulus sufficient for producing significant pressure in the fiber as particles solidify in the fiber. For example, given a fiber having a polymer cladding and chalcogenide glass spheres internal to the fiber, an internal glass sphere pressure of only about 10 MPa can be attained.

The periodic high-stress domains enabled by the in-fiber particles further can be customized for particular applications. For example, in-fiber particles having selected geometries, such as the nested shell or other geometry described above, can be provided with reactive materials that can react when subjected to the high-pressure in-fiber environment that is produced with particle solidification. Janus particles, azimuthally-inhomogeneous particles, or other selected arrangement of particle materials can accordingly be employed for conducting chemical reaction or other intermaterial interaction at a localized and controlled site or sites within a fiber.

Of particular benefit is the ability to control the chemical and/or electrical properties of a material disposed in an in-fiber particle by control of the in-fiber particle pressure. For example, for many semiconducting materials, it is well-established that the electronic bandgap of the material is highly dependent on the stress level of the material. For silicon, the dependence of the first indirect bandgap, $E_g$, on stress, P, is:

$$\frac{dE_g}{dP} = -0.014 \frac{\text{eV}}{\text{GPa}} \qquad (8)$$

And for germanium, the dependence of the first indirect bandgap $E_g$, and first direct bandgap $\Gamma_1$, are:

$$\frac{dE_g}{dP} = 0.050 \frac{\text{eV}}{\text{GPa}}; \frac{d\Gamma_1}{dP} = 0.121 \frac{\text{eV}}{\text{GPa}}. \qquad (9)$$

With this direct dependence of electronic bandgap on material stress, the in-fiber particle production method can be applied for controlling the bandgap of the in-fiber particles to shift the bandgap energy of the particles either negatively or positively from the free-space bandgap energy of the material. This bandgap width energy dependence on hydrostatic pressure is a general property of crystalline materials, and therefore can be imposed for any suitable crystalline material; for instance, for GaSb, $$\frac{d\Gamma_1}{dP} = 0.12 \frac{\text{eV}}{\text{GPa}},$$

which is similar to that for Ge.

It is recognized that in practice, pressure at the surface of a particle can be different than the internal pressure within the particle volume for various material morphologies. For example, for crystalline materials, the solidification of a molten droplet of such, e.g., Si or Ge, is a rather complex process that is not necessarily uniform and that can therefore result in non-uniform pressure distribution in a solid crystalline sphere. The internal particle pressure thereby can have an inhomogeneous pressure distribution, e.g., a radial pressure distribution. Such a radial pressure distribution can result in a radial gradient in particle material composition, a radial gradient in particle morphology, a radial gradient in particle phase, or in another characteristic of the particle. These particle gradients are retained in a free-standing particle after release from a fiber cladding. Thus, a shift in bandgap energy that is achieved at the time of particle solidification is retained upon particle release from the fiber.

The solidification process can involve dendrite growth with recalescence followed by propagation of a solidification front starting from the colder surface inward, for any particle size larger than the typical dendrite radius $R_d=10$ µm. Progressive solidification of a particle can result in significant pressure focusing towards the particle center, producing at the innermost core regions of the particle a pressure that is significantly higher than at the surface, in contrast with the case of homogeneous solidification. A focus of highest pressure can therefore result at a core center site in the particle, with a lowest pressure at an outer particle surface, and a radial pressure distribution in between the two. For $2R_0 \gg 10$ µm, where $R_0$ is the radius of the spherical particle, the solidification of a particle is gradual, starting from the particle surface, while for $2R_0 \leq 10$ µm, the solidification is uniform through the whole particle volume; a mixed scenario is expected for intermediate particle sizes. Considering particle sizes for which the dendrite radius is not a limiting factor, the particle solidification scenario depends on the heat conduction, thermal diffusion and dimensions of the solidifying particle, as well as on the thermal inertia of the fiber cladding.

Thus, the solidification scenario is expected to change for a constant fiber cladding thickness as a function of the particle size, as well as for a constant particle size as a function of the cladding thickness. But in general, for any solidification scenario, there can be produced an in-fiber domain of high pressure that generally follows the Expression (6) above for specifying the pressure produced by selected fiber cladding and particle materials.

To experimentally determine the pressure at a particle surface, there can be considered the condition in which during solidification, an in-fiber particle strains the surrounding fiber cladding material. The resulting state of strain in the fiber cladding alters the optical refraction properties of the cladding material, whereby the index of refraction of the fiber cladding around a solidified in-fiber particle is proportional to that resulting strain. A measurement of the intensity distribution of light transmitted around an in-fiber spherical particle, when placed between two crossed polarizers, thereby provides a determination of the pressure at the spherical particle's surface within the fiber.

This intensity distribution has the form:

$$I = 2I = \tfrac{1}{2} E^2 \sin^2 2\theta [1 - \cos \Gamma(\rho)] \qquad (10)$$

where $\theta$ is the azimuthal and $\rho$ is the radial coordinate in the image plane, and where:

$$\Gamma(\rho) = \int_{-R_{out}}^{R_{out}} \frac{\partial \Gamma}{\partial z} dz = \int_{-R_{out}}^{R_{out}} \frac{2\pi}{\lambda_0} \Delta n_{\rho,\theta}(\rho, z) dz. \qquad (11)$$

Here $\Delta n_{\rho,\theta}(\rho,z)$ is the azimuthally symmetric birefringence in the fiber cladding that is induced by the pressure that a spherical particle applies on the cladding, for a given free space wavelength $\lambda_0$, and $R_{out}$ is the outer radius of the fiber. $\lambda_0$ is a visible wavelength, for example, 532 nm. An azimuthal intensity distribution has a 4-fold symmetry and is invariant of both the pressure at the particle-cladding interface and the particle size. On the other hand, $\Gamma$, defining the radial dependence of the intensity distribution, I, is a function both of the particle size and the pressure at the particle-cladding interface. For a given particle size, the number, N, of $\rho$'s for which $\Gamma$ is an integer multiple of $2\pi$ is a function of pressure at the sphere surface. Thus, the number of dark radial fringes that are observed to exist in the halo around an in-fiber particle indicates the pressure at the particle-cladding interface. Knowing that the number, N, of the dark fringes in the halo doesn't exceed a certain quantity, there can be calculated an upper limit of radial pressure at the particle surface.

Figure 6:
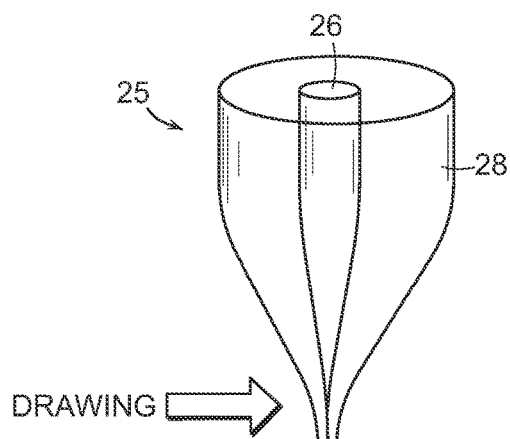
FIG. 6 is a schematic view of a method beginning with fiber preform assembly and ending with release of particles from the fiber in which they were formed subsequent to fiber preform drawing.
Figure 6:
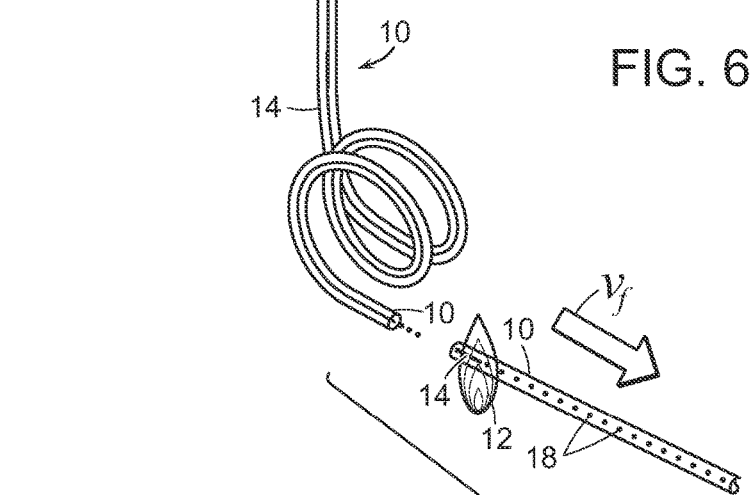

As explained above, depending on the material composition of an in-fiber particle and the material composition of the fiber cladding, a particle that is solidifying after pinching off from the end of a molten fiber core may physically contract or may physically expand. If the particle contracts, rather than expands, during solidification, then a domain of vacuum is generated in the fiber at the site of the solidified particle. A condition of vacuum can be verified by optical imaging of an in-fiber particle to determine the physical condition of the internal surface of the cladding; under vacuum conditions, it can be expected that sublimation of some material from a particle surface onto the internal cladding surface can occur. Thus, in the manner of the high-pressure in-fiber domains described just above, there can be produced a sequence of in-fiber vacuum domains along a length of fiber, at prescribed intervals along the fiber, for enabling a range of applications. Many crystalline materials contract upon solidification. Therefore domains of vacuum can be generated at the site of a solidified particle produced from a wide range of materials such as iron, cobalt, nickel, copper, aluminum, cadmium telluride, and other suitable materials Considering now a process for forming particles by starting with production of a corresponding fiber, and referring to FIG. 6, a fiber 10 is formed by first assembling a fiber preform 25 that includes one or more fiber preform core elements 26 and fiber cladding material 28. Each fiber preform core element has a preselected diameter that is selected based on a consideration of the preselected particle diameter that is desired. The fiber preform 25 is thermally drawn, as represented by the tapered drawing-down or necking-down region in the figure, into a fiber 10 under draw conditions that produce a selected diameter for the fiber and the core 14 or cores in the fiber. At least a portion of the fiber is then fed into a spatially localized heating site 12 with a selected fiber velocity, $v_f$, to form particles 18 in the fiber from the fiber core 14, with a particle diameter that is set by the fiber velocity for the fiber core diameter in the manner given above. After a string of solidified particles are formed, the cladding 16 of the fiber can then be removed, if desired, e.g., through liquid processing in a vessel 30, to release the spherical particles 18 from the fiber.

For many applications it can be preferred to preserve the spherical particles immobilized in the fiber cladding material, rather than released from the cladding. This arrangement provides a string of embedded particles in a fiber having a length that can be more than one hundred times its cross sectional area. While embedded in the fiber cladding, the particles are isolated from each other and therefore cannot agglomerate in the manner often occurring in conventional nanoparticle synthesis. Being disposed interior to, or internal to, the fiber cladding material, each particle can be provided with a buffer between it and all other particles, even for very large particle density. Thereby, this arrangement of embedded particles within a fiber cladding layer can be employed for applications, e.g., in which there is required a three-dimensional distribution of particles in a uniform matrix.

Alternatively, surface passivation of particles released from a fiber can be carried out to prevent agglomeration of the particles. For example, the particles can be coated with a selected spray species, e.g., a polymer spray, to form a layer on the particles as the fiber cladding material is dissolved or otherwise removed. Alternatively, the fiber cladding removal can be conducted in a flowing solution that includes a high concentration of a particle-coating material. Here the flow of the solution can be employed to maintain spacing between the particles as the particles are released from the fiber. Further, the particles can be exposed to a passivating agent, such as an oxidizing environment, that prevents agglomeration. These examples demonstrate that a wide range of processes can be applied to prevent agglomeration of particles upon release from the fiber.

In the in-fiber particle production process, the diameter, d, of a spherical particle produced in the fiber cannot be smaller than $$\sqrt[3]{\frac{3\pi}{2}} D,$$

where D is the diameter of the drawn fiber core prior to heating in the production of the spherical particles. Therefore, prior to the particle formation process, a fiber can be processed in any suitable manner to achieve a fiber core diameter that can enable production of a selected spherical particle diameter. For example, a fiber can be thermally redrawn multiple times, can be tapered, or otherwise suitably processed, to achieve a fiber core diameter that can produce a selected spherical particle diameter by control of fiber velocity into a thermal gradient, based on the fiber velocity relationship with diameter given above. For example, a thermally drawn fiber including a core having a diameter of 130 μm can be redrawn to achieve a core diameter of 4 μm, and can be further redrawn to achieve a core diameter of about 340 nm. Any suitable fiber processing can be conducted to achieve a selected fiber core diameter to be employed in the spherical particle production methodology.

A wide range of particle structures can be produced by the thermal particle production process by arranging a fiber preform with corresponding geometry. Such s particle structures and methods for forming fiber preforms for such structures are taught and illustrated in U.S. Patent Application Publication 2013/0202888 A1, published Aug. 8, 2013, the entirety of which is hereby incorporated by reference. In a first example, homogeneous particles of fiber core material can be produced, with homogeneous electrically conducting, electrically semiconducting, including electronically-doped, or electrically insulating material. Alternatively, the particles can include inhomogeneous regions of materials, i.e., a plurality of distinct materials can be included in the particle, in any suitable arrangement. For example, the produced particles can exhibit a core-shell construction; i.e., the produced particles can be fabricated as spherical cores each surrounded by a spherical shell. In a fiber preform for producing such core-shell spherical particles, there can be provided a fiber core, having a core diameter, $D_1$ with a cladding layer provided around the core and a scaffolding layer provided around the cladding layer. After drawing this preform down to a fiber, then when subjected to the particle production process, the core and shell layer form core-shell particles held immobilized in the scaffold fiber cladding material. This particle geometry can be extended to spheres including a plurality of concentric, nested, spherical shells surrounding a spherical core.

In a second example of a structured particle that can be produced by the post-draw thermal processing described herein is a broken-symmetry, Janus particle, comprising two hemispheres of different materials that can be co-drawn with into a fiber. In formation of the fiber, there is assembled a preform including a half cylinder of each of the selected core materials, wrapped in a selected cladding material. After fiber draw, the fiber core includes a first half cylinder and a second half cylinder of the two selected core materials, surrounded by a cladding layer. Thermal processing of the fiber is then conducted to cause formation of Janus particles of the fiber core producing spherical Janus particles having a first hemisphere and a second hemisphere, corresponding to the first half cylinder and the second half cylinder in the fiber.

The core-shell particles and two-compartment Janus particles just described are prototypical structures from which more complex geometries can be constructed from the particle formation process. For example, multilayer particles can be produced including a core of nested cylindrical shells of appropriate thicknesses, and within the nested core, azimuthal compartments can be provided by arranging the core with azimuthal sections. Each of the cylindrical shells and each of the azimuthal sections can be provided as distinct materials, or selected materials can be alternated or otherwise arranged in a selected configuration for the particle.

In the production of these many examples of particle geometries, and in general, in the production of particles, a fiber preform is assembled that exhibits the macro-scale arrangement of materials that will result in a selected particle geometry. For example, in the production of spherical particles, a selected core material for producing spheres is provided, e.g., as a cylindrical rod. The rod can be inserted in a cladding material structure or cladding material can be layered around the rod. Any suitable number of fiber cores can be arranged in a fiber preform for producing arrays of particles in the fiber, and the fiber cores can be dimensioned and positioned relative to each other for the production of particular particle geometries.

Figure 7:
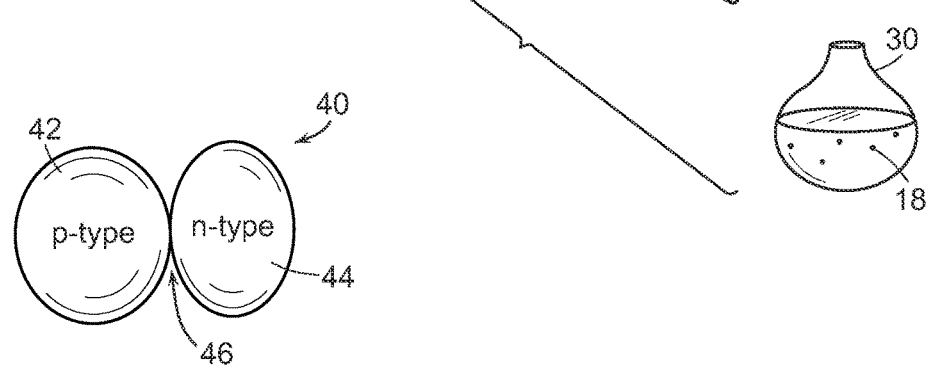
FIG. 7 is a schematic side view of a bi-particle cluster providing a p-n junction at the intersection of the two particles.

For example, if two fiber cores of equal diameter are provided, then the simultaneous formation of particles from those two cores, as shown in FIG. 2, can be employed to produce bi-particle clusters. The localized boundary of the heating site 12 uniquely defines a fixed droplet pinch-off location for equally-sized cores, forcing each of the cores to form droplets in a spatially coherent manner. Then, by conservation of volume the diameter of the solidifying spheres sphere is larger than the core cylinder from which they were formed. As a result, referring to FIG. 7, spherical particles that are produced from multiple closely-separated cores can come in contact with each other to form multi-particle clusters 40, as shown in FIG. 7. Such a configuration can be produced if in the fiber to be thermally processed the distance between multiple cores is smaller than the diameter specified for the generated spheres based on the control process conditions. This results in complexes of partially-merged spheres. For many applications, such partially-merged spheres can be configured as devices. For example, if one sphere 42 is an electrically semiconducting p-type material and one sphere 44 is an electrically semiconducting n-type material, then a p-n junction 46 can be formed at the physical interface between the two spheres, resulting in a bi-spherical p-n molecule that can be configured as an electronic device.

It is noted that such a p-n junction molecule requires that the p-type material core be separated from the n-type material core in the fiber by the fiber cladding material. A fiber having, e.g., a silicon core formed of p-type and n-type silicon half-cylinders in contact with one another could not form the bi-particle p-n junction because in that case, material diffusion would completely homogenize the dopants across the silicon core during the fiber preform draw when the silicon is molten.

These examples demonstrate that in the assembly of a fiber preform for producing a fiber and spherical particles therefrom, there are included one or more elongated core regions of material that are configured geometrically to form selected particle geometry or multi-particle cluster configurations. Suitable fiber preform core materials can include polymers, glasses, metals, and crystalline materials. The fiber preform cladding material is selected, based on the fiber core material or materials, to enable co-drawing of the fiber core and cladding materials and to enable formation of spherical particles from the core materials as explained above. Examples of fiber preform assemblies and thermal drawing of compatible glassy, metal, and polymer materials are described and illustrated in U.S. Pat. No. 7,295,734, which issued Nov. 13, 2007, and the entirety of which is hereby incorporated by reference.

For example, in the formation of core-shell particles, a preform can be produced by, e.g., extruding a cylindrical billet through a circular die. An example of such a billet consists of three discs: a first, top disc is polymer, a middle disc is glass, and a bottom disc is again polymer. The billet is heated to above the softening temperature and then pushed vertically downward through the die under pressure. The resulting extruded rod can then be employed as a preform to draw a fiber for production of a polymer-glass core-shell particle.

In the formation of Janus particles or other azimuthally-structured particles, there can be arranged in a corresponding fiber preform the requisite materials having an arrangement of shapes for production of particle compartments. For example, two glass half-cylinders with similar viscosities at a selected particle formation temperature can be arranged as a cylindrical core with a cladding layer, e.g., a thin layer of PES, rolled around the two half cylinders. A multi-section 'beach ball' particle can be produced from a fiber preform assembled from a number of sections, e.g., six sections, three each from two different materials that are extruded or otherwise shaped accordingly. A cladding layer can be rolled around the assembled sections, and the preform consolidated under vacuum.

Considering fiber core arrangements in general in a fiber preform, a fiber core structure can be provided in a preform as, e.g., a rod or strand, a wire, a foil, a sheet, or other suitable article of material. Thermal evaporation, E-beam evaporation, sputtering, chemical vapor deposition (CVD) and other physical deposition techniques can also be employed for producing preform elements. Drilling, casting, molding, and other techniques can be employed for producing a preform with a selected cladding and core arrangement. For example, holes can be drilled in a polymer or silica body and conducting or semiconducting strands or other elements fitted into the drilled regions. Any preform assembly technique that accommodates all of materials in an arrangement that enables co-drawing of the materials can be employed.

Depending on the selected preform assembly technique and resulting arrangement, it can be preferred to thermally consolidate an assembled preform prior to the fiber drawing process. Consolidation is a process whereby under heat and vacuum conditions one or more of the preform materials are caused to fuse together, with air pockets in the preform being substantially eliminated. This results in a preform assembly that can produce intimate interfacial contact between adjacent material layers in the final fiber, and provides the preform with self-maintaining structural stability during the fiber draw process.

Fiber drawing can be carried out in a fiber draw tower or other suitable draw apparatus. It can be preferred to employ a vertical draw furnace enabling three temperature zones, namely, top, middle, and bottom temperature zones, with the top zone temperature causing the preform materials to soften but not flow and the middle zone temperature being the draw temperature, to cause the preform to flow into a fiber. The draw furnace temperature zones, preform downfeed speed, and output capstan speed are selected based on the preform materials and configuration to enable co-drawing of material elements into a desired fiber configuration. If an excessively high draw temperature is employed, the preform will catastrophically deform, while an excessively low draw temperature will cause preform distortion and expansion. The structural arrangement of the preform must be preserved at the draw temperature. For example, for a fiber preform including silica cladding, a fiber preform draw temperature of about 2100° C. can be employed, while for a fiber preform including a PSU cladding, a fiber preform draw temperature of about 285° C. can be employed. A typical fiber feed speed is about 1 mm/min with a typical draw speed being between about 0.1 m/min and about 10 m/min, depending on the desired scaling ratio between the fiber preform and the drawn fiber.

It is therefore to be recognized that some experimental testing of draw temperatures, fiber feed speeds, and fiber draw speeds can be required for a given preform material assembly. A reasonable criterion is that glassy and polymer materials have a viscosity lower than about $10^8$ Poise at the draw temperature and that metal and crystalline materials be molten at the draw temperature. After fiber preform draw into a fiber, the fiber can be directly fed into the localized heating site for production of in-fiber particles in the manner described above.

As explained above, after producing of in-fiber particles, the particles can be released from the fiber with a suitable liquid-phase or gas-phase process. Acids, such as hydrofluoric acid in the case of silica fiber cladding, or a selected solvent in the case of a polymer cladding, can be employed for removing particles from fiber cladding, to produce free-standing particles that retain their in-fiber characteristics.

Example I

Thermal Fiber Preform Draw, Redraw, and Taper to Produce a Selected Fiber Core Diameter A fiber preform was assembled to produce a silicon fiber core for production of silicon particles in a fiber drawn from the preform. The preform was produced with a 10 cm-long, 2 mm-diameter wide silicon rod, from Lattice Materials, sleeved into an 8 mm-thick silica quartz cladding tube that was vacuum fused with a thick rod to seal the bottom of the tube and that was vacuum fused with a thick rod on top to close the pocket in the tube after the silicon rod was inserted. The quartz was obtained from Technical Glass Products, Painesville Twp. Ohio. The fiber preform was drawn in a fiber draw tower at a center furnace hot zone draw temperature of 2130° C., with a draw feed velocity $v_f$=1.2 mm/min and with a draw speed $v_d$=0.3 m/min. This thermal fiber draw yielded a fiber with an outer fiber diameter of 500 μm and a silicon core diameter of 130 μm.

The fiber was then configured in a second preform for a second thermal draw to further reduce the diameter of the silicon fiber core. The second preform was arranged with a second silica cladding tube having a diameter of 12 mm, into which the drawn fiber was fed. The second silica cladding tube was vacuum fused on top and bottom. This second preform including the fiber was drawn at a fiber draw tower hot zone furnace temperature of 2095° C., with a feed speed $v_f$=1.2 mm/min, and a draw speed $v_d$=2 m/min. This draw produced a fiber having an outer fiber diameter of 280 μm and a silicon core thickness diameter of 4 μm. The fiber was then protected with an in-line UV curable coating system. The coating layer was coating 3471-3-14(941-314) Desolite single coat coating from DSM Desotech, Elgin, Ill., with a thickness of between 20-40 μm.

It was found, at this fiber redrawing step, that in order to avoid the breakup of the silicon core inside the preform during the redrawing step, the preform had to be fed as fast as possible into the draw tower hot zone, and had to be drawn as fast as possible, to minimize the dwell time of the silicon core in the hot zone of the draw tower furnace. This condition could be satisfied while successfully drawing the preform because only 100-200 μm of material in the center of the active part of the preform contained material different than silica, and therefore a crack-free draw of the preform was achieved. In addition, the draw temperature was set at the lowest possible temperature, 2095° C., that would prohibit cracking.

The redraw of the fiber with a 130 μm-thick Si core under the conditions described above resulted in a 60 m-long continuous section of Si core fiber having an outer diameter of 280 μm, starting from a thin core at the beginning of the draw—(thinnest sampled was 0.5 μm thick) growing in a few meters and stabilizing at (4±5%) μm. This is found to be roughly the thinnest stably drawable and controllably scalable core size that can be achieved with a conventional thermal fiber preform draw process.

Conventional fiber drawing processes are characterized by a ratio of preform feed speed, $v_f$, to fiber drawing speed, $v_d$, ranging from 2 to 4 orders of magnitude, resulting in a typical preform-to fiber cross-sectional scaling ratio of a few tens to a few hundreds. When producing silica-cladding fibers, such a $v_f/v_d$ ratio requires the draw to be performed under conditions of a relatively low silica viscosity in order to avoid cracking of the fiber cladding during the draw due to the viscous rupture phenomenon. On the other hand, the achievable range of scaling ratios limits the size core in the fiber preform to diameters that can cause silicon core breakup to occur in the drawing cone prior to descending into the fiber, the more so that the high interfacial tension $\gamma$=1.5 J/m$^2$ between the core and the cladding speeds up the breakup process. The last would result in a fiber with an uneven Si core of random diameter along the fiber length. A faster feed speed can partially compensate for this condition by shortening the dwell time of Si in the drawing cone, where the Si is sensitive to the capillary instabilities. But this can result in a decreased cross section scaling ratio, producing a thicker fiber core. Thus, to maintain the core thickness unchanged, the draw speed is increased, which requiring an additional decrease in silica viscosity for crack-free fiber draw.

To overcome the limitations of the conventional fiber draw, the redrawn fiber was then subjected to torch scaling by drawing under high tension in a hydrogen flame. During a first scaling process the fiber was fed through the hot spot of a hydrogen flame resulting from the burning of hydrogen flowing at the rate of 0.23 l/min through the aperture of a torch outlet having a small diameter of 0.020 inches. Such a small diameter of the outlet aperture was chosen in order to focus the flame and to prevent flashback explosions at this low flow-rate. The fiber was fed at a speed of 3 mm/min and drawn at a speed of 15 mm/min. With this process, the 4 μm-thick Si core of the fiber was rescaled 3 times. For each consecutive re-scaling iteration the hydrogen flow was reduced by 0.02 l/min in order to compensate over the decrease in a heat capacity of the rescaled fiber, so that the high tension conditions could be maintained.

With these torch scaling steps, the fiber diameter was scaled by a factor of $n=\sqrt{v_d/v_f}=\sqrt{5}$ while maintaining the Si core intact and without inducing any cracking in the fiber. As a result, starting with a 4 micron-diameter Si-core fiber, the triple rescaling process produced a continuous Si-core fiber with an outer diameter of (24±1) μm and a silicon core diameter of (340±15) nm. This combination of torch scaling and fiber preform drawing is therefore demonstrated to enable the production of nanometer scale core fiber diameters while maintaining the integrity of the fiber. The fiber preform drawing and torch scaling steps can be repeated multiple times until a desired diameter is achieved for a fiber core, such as the Si core here. Starting with a 2 mm-thick silicon rod, the process here produced a continuous Si-core fiber with a core diameter of (340±15) nm.

Example II

In-Fiber Particle Production with Fiber Speed-Controlled Particle Diameter

Sections of the drawn fiber from Example I were not subjected to the triple scaling process, preserving the silica-clad fiber with a silicon core diameter of 4 µm. Six different fiber sections were then cut and individually subjected to the dynamic in-fiber particle production process. For each process, a fiber section was fed through the hot zone of a hydrogen/oxygen flame with a hydrogen flow of 0.3 l/min and an oxygen flow of 0.1 l/min. Each of the six sections were fed through the flame at a different fiber speed, $v_f$, as defined above, of 2 µm/s, 10 µm/s, 30 µm/s, 50 µm/s, 70 µm/s, and 90 µm/s. Only this fiber speed was varied; the hydrogen and oxygen flows were maintained constant. As the fiber lengths were fed through the flame, the edge of the silicon core in the fiber broke off at the flame location, in the manner described above, forming a sequence of particles in the fiber.

Figure 8B:
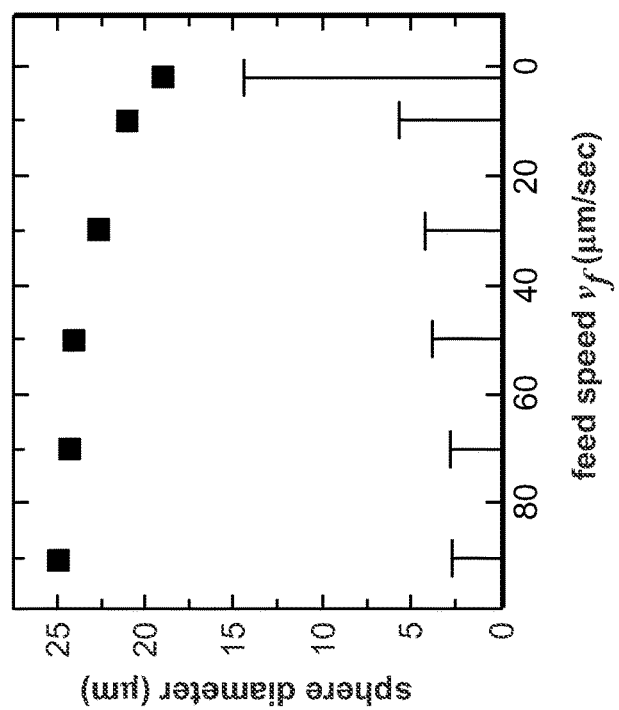
FIG. 8B is a plot of measured spherical particle diameter as a function of fiber speed for in-fiber spherical particles.
Figure 8A:
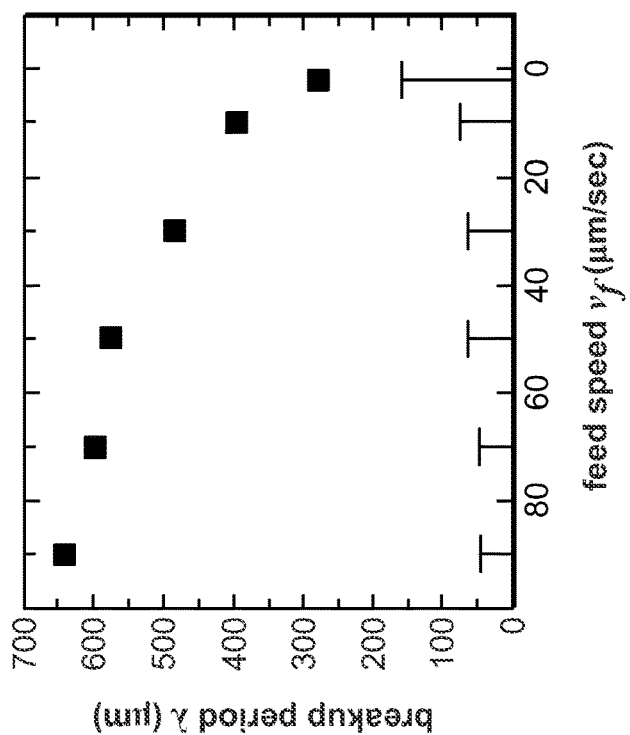
FIG. 8A is a plot of measured particle breakup period as a function of fiber speed into a localized heating site for production of in-fiber particles.

FIG. 8A is a plot of the measured periodicity of particle formation, termed the breakup period, $\lambda$, shown in the plot as squares, as a function of fiber feed speed for the six fiber feed speeds. FIG. 8B is a plot of the measured diameter, shown in the plot as squares, of the in-fiber spherical particles that were produced for the six fiber feed speeds. In each of the plots, the bars at the bottom of the plots are the standard deviations for each of the sample measurements, shown 10-fold magnified for the breakup periods and shown 1000-fold magnified for the sphere diameter measurements. The error in measured sphere diameter is assumed to originate from both the breakup period and from fiber core thickness instabilities.

One of the lengths of fiber from Example I that was subjected to a double torch scaling procedure was then subjected to the in-fiber particle production process under the flame conditions of this Example, with a fiber feed speed of 20 µm/s. The measured silicon particle diameter was found to be 6 µm.

From this measured data, it is demonstrated that the dynamic thermal in-fiber production process is fiber speed-dependent. Slower feed speeds induced the formation of smaller silicon spheres than higher feed speeds, for the constant heating site temperature. The breakup period was reduced by a factor of 2 by varying the fiber feed speed, in turn reducing the silicon sphere diameter by 20%. Thus, the particle diameter was proven to be controllable by fiber feed speed.

In further experimental testing, six fibers were separately produced each including a silicon core and silica cladding, and two fibers were separately produced each including a germanium core and silica cladding. For each of these eight separate fibers, there was conducted experimental in-fiber particle production with a hydrogen/oxygen flame. A fiber speed of either 10 µm/s or 20 µm/s was employed with each fiber. Table II below presents the in-fiber particle formation conditions and the measured diameter of the in-fiber spherical particles that resulted for each fiber.

TABLE II

| Fiber Core Material | Outer Fiber diameter [µm] | Fiber Core diameter [µm] | H flow [l/min] | O flow [l/min] | Distance from the H/O torch outlet to the fiber [mm] | Fiber feed speed [µm/sec] | Measured Spherical particle diameter [µm] |
|---|---|---|---|---|---|---|---|
| Si | 1230 | 183 | 0.55 | 0.23 | 6 | 10 | 450 |
| Si | 670 | 82 | 0.36 | 0.13 | 6 | 10 | 230 |
| Si | 760 | 63 | 0.41 | 0.15 | 6 | 10 | 190 |
| Si | 1670 | 45 | 0.52 | 0.2 | 6 | 10 | 160 |
| Si | 280 | 4 | 0.3 | 0.2 | 10 | 20 | 26 |
| Si | 56 | 0.8 | 0.3 | 0.2 | 10 | 20 | 6 |
| Ge | 480 | 111 | 0.43 | 0.15 | 10 | 10 | 250 |
| Ge | 700 | 10 | 0.34 | 0.11 | 10 | 10 | 35 |

These results demonstrate that consistent with Expression (5) described above, particle diameter has a direct dependence on fiber core diameter for a given fiber feed speed.

Example III

Submicron-Diameter in-Fiber Particle Production

Fabrication of 100 nm-scale silicon Si spheres was experimentally conducted by first fabricating a fiber with a 23 µm outer diameter including silica cladding and a 325 nm-diameter Si core following the fiber preform draw and triple torch scaling procedure of Example I. To produce silicon particles, the fiber was fed at a fiber feed speed of 10 µm/sec through the hot zone of a hydrogen/oxygen flame with gas flow rates set to 0.17 l/min and 0.08 l/min, respectively. After particle production in the fiber, the spheres were released from the silica cladding by chemical etch of the cladding using hydrofluoric acid (HF).

Statistical analysis on scanning electron micrograph (SEM) images of the spheres released from the fiber cladding revealed that the diameter distribution of the spheres fit a normal distribution centered at (460±24) nm, with an average pitch of (1.4±0.3) µm, which is uniform over a cm length scale. This pitch size closely approaches the ultimate limit achievable by capillary breakup phenomena, $\lambda = \pi D = 1$ µm, which is unapproachable by isothermal breakup. Electron backscatter diffraction (EBSD) measurement on a single sphere surface showed a diffraction pattern across the entire sphere meridian, suggesting that the sphere was composed of diamond cubic silicon.

To obtain an in-depth understanding of the structure of the Si spheres, a cross-sectional sample was prepared for transmission electron microscopy (TEM) using focused ion beam (FIB). In this process, a section of fiber including particles was immobilized on a CF300-CU carbon film on a 3 mm-diameter 300 Cu mesh copper grid from Electron Microscopy Sciences, Hatfield, Pa., and then immersed in HF, to enable imaging with a JEOL 2010FEG TEM, Peabody, Mass., at 200 kV. Then ion beam sectioning of a sphere was completed using a FEI Helios NanoLab 600, Burlington, Mass. Selected area electron diffraction (SAD) of the core of the representative Si sphere revealed that the silicon was diamond cubic and multi-crystalline, with several grains comprising the bulk of the volume.

It is well established that the oxygen solubility in equilibrium diamond cubic Si does not exceed fractions of a percent and that the main origin of oxygen in polycrystalline Si is oxide formation at the grain boundaries. To investigate the possible oxide formation at the grain boundaries, energy dispersive x-ray spectroscopy (EDX) was used to qualitatively map the distribution of oxygen within a sphere core. The EDX line scan did not reveal any increase in the oxygen signal at grain boundaries, indicating that that the oxygen content in the Si core was below the detection limit of EDX and that the multi-crystalline silicon spheres were sufficiently pristine for electronic applications, having oxygen content comparable to that typical for electronic-grade silicon.

TEM was used to better elucidate the microstructure of the whole Si sphere. It was found that the silicon spheres included a porous shell on the sphere surface. The shell was composed of crystalline Si 'fingers' protruding from the core and was presumably where an interpenetrated Si/Silica mixture formed at the interface between the Si sphere and the silicon cladding. The material forming the 'fingers' was confirmed to be Si by obtaining its lattice constant based on high-resolution TEM images.

It is hypothesized that these interpenetrated fingers were either a result of the Si expansion upon crystallizing in a silica cavity of dimensions that correspond to the liquid Si, in which case the fingers provided a mechanism for stress release, or were a result of diffusion of Si into surrounding silica with consequent precipitation of the silicon into Si nano-clusters due to prolonged thermal treatment, or a combination of both.

Example IV

In-Fiber Particle Cluster Production

A fiber preform including two separated Si rods was prepared in the manner described above, with two separate silica tubes, and drawn into a double-core fiber. One of the Si rods was p-type with an electron acceptors concentration $N_A=6.9\times10^{18}$ cm$^{-3}$) and the other Si rod was n-type, with an electron donor concentration $N_D=1.6\times10^{19}$ cm$^{-3}$. The two rods were each had a diameter of 2 mm and each were sleeved into a preform with a silica cladding of 12 mm. The preform was thermally drawn at a draw temperature of 2130° C. with the feed speed $v_f=0.6$ mm/min and draw speed $v_d=0.6$ m/min.

A section of the resulting fiber was incorporated into a new preform in a similar fashion described in Example I. The new preform was then drawn with a feed speed $v_f=1.2$ mm/min and draw speed $v_d=1.2$ m/min at a draw temperature of 2085° C. The resulting fiber cross section maintained the geometry of the original preform, with a separation of cladding preserved between the two cores. Both cores had the same diameter of 23 µm.

A section of this dual-core fiber was then subjected to the dynamic heating process at a fiber feed speed $v_f=20$ µm/s into a flame that was produced by gas flows of hydrogen and oxygen of 0.42 l/min and 0.20 l/min respectively. This resulted in the production of a chain of in-fiber bi-spherical p-n junction particles. The bi-spherical p-n junction particles were released from the fiber by dissolving silica cladding in HF acid. This production of p-n junction particles demonstrated that if the distance between multiple cores in a drawn fiber is smaller than the a priori specified diameter of the spheres to be produced, then complex structures including partially merged spheres can be formed.

Each cluster did not reshape into a single large sphere. Instead, each cluster remained in the form of a bi-particle cluster. This likely resulted from the presence of the aforementioned mixture layer membrane on the contact surface between the merged spheres, in analogy to the case where two occasionally touching soap bubbles merge into a single "double bubble" with a thin membrane in between. The membrane of interpenetrated Si/Silica composite between the p-type and the n-type halves of the merged cluster could have acted as a diffusion barrier for dopants, thereby maintaining electronic properties of the junction. Without this layer, the dopants would likely have completely homogenized over the entire cluster volume.

Figure 9:
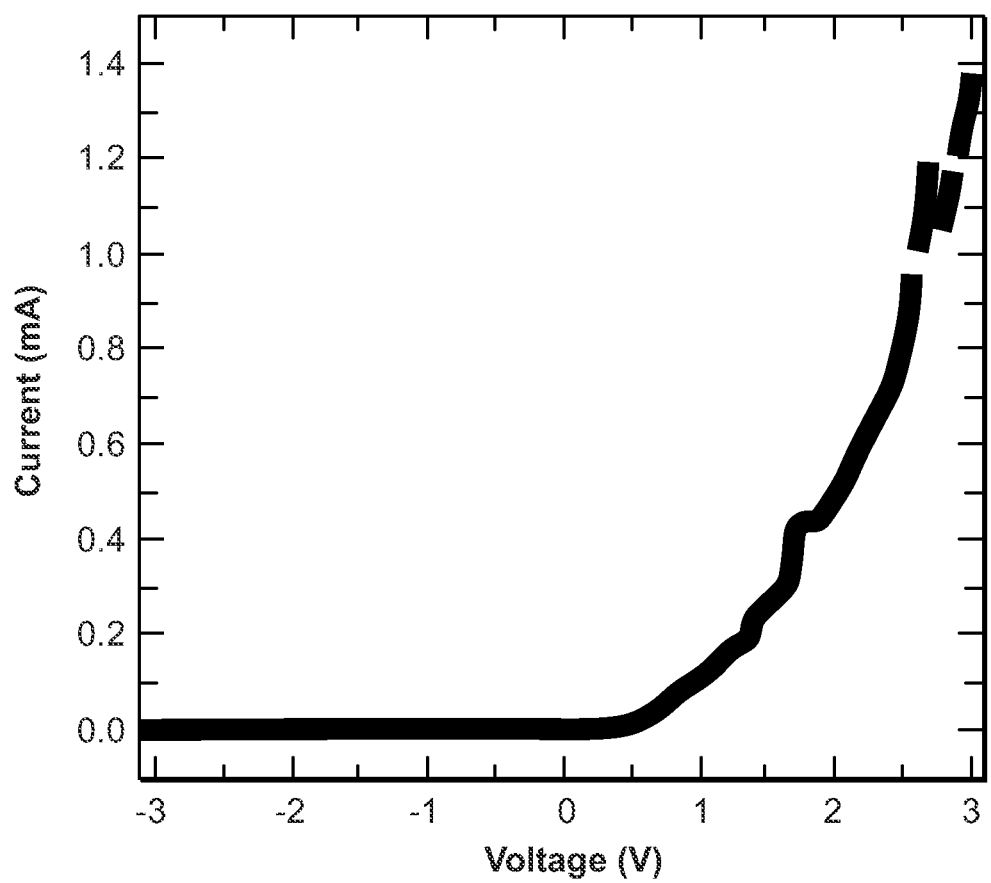
FIG. 9 is a plot of the measured current voltage characteristics for an experimental p-n junction bi-particle cluster like that shown in FIG. 7.

The current-voltage characteristic of a p-n junction particle after release from the fiber was conducted using two tungsten needles of 2.4 µm, from Cascade Microtech, PTT-24-25, brought into contact with the spheres' surfaces using manual probe positioners from Cascade Microtech, Beaverton, Oreg. A voltage was applied between the probes using a Keithley 6517A Electrometer while the current was measured with a Keithley 6487 Picoammeter, Keithley Instruments, Cleveland, Ohio, with both units being controlled by a LabView custom interface, National Instruments, Austin, Tex. FIG. 9 is a plot of the current-voltage characteristics of a p-n junction particle, which clearly displaying rectifying behavior, consistent with the polarity of the particle, here operating as a rectifying device.

Example V

In-Fiber Particle Bandgap Control by Pressurization

Fourier transform infrared spectroscopy (FTIR) was conducted on a silicon in-fiber particle and on a germanium in-fiber particle to determine the internal pressure and corresponding bandgap shift for each particle. The silicon particle was a 450 µm-diameter sphere and the germanium particle was a 35 µm-diameter sphere. The silicon particle was produced as specified in the first row of Table II and the germanium particle was produced as specified in the last row of Table II.

A transmission/reflection spectrum was measured for an in-fiber particle of material and the "stressed" spectrum was compared to the spectrum measured for unstressed in-fiber core material from which the particle was formed. The transmission/reflection of photons of energies lower than the bandgap energy is described by Fresnel reflection coefficients, while for bandgap photon energies and higher, the absorption rapidly increases and the transmission/reflection decreases steeply. The spectral location of the bandgap edge for a given material shifts proportionally to the stress applied, as explained above and shown for Si and Ge in Expressions (8) and (9).

Each fiber was separately placed under a microscope objective such that the fiber was aligned perpendicularly to the optical axis of the microscope and FTIR radiation illuminated the spherical particles embedded in the silica cladding of the fiber through the iris, restricting the illumination to the central part of the sphere in the image plane. Separately, a length of each fiber that was not subject to particle formation was imaged. The absence of stress in the referencing measurement region was visually verified.

FTIR measurement of the Si in-fiber spherical particle indicated a negative bandgap shift, to the red, of 0.050±0 0.005 eV in the particle material, which corresponds to an average internal pressure of 3.5±0.4 GPa within the volume of the spherical Si particle. FTIR measurement of the Ge in-fiber spherical particle indicated a positive bandgap shift, to the blue, of 0.090±0.005 eV, which corresponds to an average internal pressure of 1.8±0.1 GPa within the volume of the spherical Ge particle. These measurements assume that high energy photon absorption is dominated by the indirect bandgap. These measurements experimentally demonstrate that a shift in bandgap energy can be imposed on a particle material within a fiber.

Example VI

In-Fiber Vacuum Production

A fiber having a copper core and silica cladding was drawn and in-fiber spherical particles of Cu were produced. The fiber was provided with a 6 µm-diameter copper core, and to produce Cu particles, was fed at 10 µm/sec through a pure hydrogen flame resulting from a flow of 0.4 l/min of hydrogen. The distance from the torch orifice to the fiber was 3 cm. The resulting breakup period of particles in the fiber was 1.7 mm. The resulting particles had an elliptical shape an elongated axis of which aligned with the fiber axis. The silica cladding was transformed, at the site of each elliptical particle, into vessel including a vacuum void empty of copper on the pole facing the direction opposite to the feed direction.

The location of a Cu particle within the fiber cladding was analyzed with an optical microscope in transmission mode. It was observed that the copper particle did not occupy the entire volume within a domain produced by hardening of the silica cladding. It was further observed that the internal wall of the silica cladding at the site of the copper particle was coated with a thin layer of copper. This copper deposition on the internal silica wall indicated significant sublimation of copper from the surface of the particle following the particle solidification. This sublimation evidenced an attainment of vacuum conditions sufficient for sublimation. The sublimation pressure of Cu is 6×10$^{-1}$ Pa, adjoining the upper limit of the range conventionally defined as high-vacuum. It was therefore demonstrated that a condition of vacuum was achieved at a domain in a fiber by physical contraction of an in-fiber particle after particle formation from a molten core in the fiber.

The Examples and description above demonstrate that the in-fiber particle production methodology by a imposing a moving thermal gradient on a fiber including one or more fiber cores enables precise dimensional control over particle production in a manner that is repeatable and scalable. The well-ordered, oriented, and immobilized particles that are produced by the thermal processing within a fiber can be employed in a wide range of applications. The particles can be removed from the fiber cladding to provide free-standing particles that retain their in-fiber characteristics of, e.g., internal pressure and material composition and morphology. A broad range of applications and can thereby be addressed:

It is recognized that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:
1. A method for producing particles comprising:
providing a fiber that has been thermally drawn from a fiber preform, the fiber having a longitudinal-axis fiber length and including at least one continuous, solid fiber core having a longitudinal core axis parallel to the longitudinal fiber axis and internally disposed to at least one outer fiber cladding layer of cladding material along the fiber length;
feeding the fiber through a localized heating site having a heating site temperature, T, at which a local viscosity of the fiber cladding material is greater than a local viscosity of the fiber core and at which an interfacial tension exists between the fiber cladding material and the fiber core, and which is above a melting temperature of the fiber core, the fiber being fed through the heating site at a fiber feed speed, $\upsilon_f$, that melts a tip portion of the fiber core upon arrival of the tip portion at the localized heating site, causing a molten droplet to pinch off of fiber core material from the fiber core tip portion, producing a longitudinal sequence of molten droplets one droplet at a time, as the fiber is fed through the heating site, with a time period of molten droplet formation set by the fiber feed speed, $\upsilon_f$, wherein the fiber feed speed, $\upsilon_f$, produces solid particles having a diameter, d, as a function of fiber core diameter, D, as:

$$d \approx D \cdot \sqrt[3]{\frac{3}{4} v_f \frac{\mu_p^{clad}}{\gamma_p}},$$

where $\mu_p^{clad}$ is local viscosity of the fiber cladding material at the heating site temperature, T, and $\gamma_p$ is interfacial tension between the fiber core material and the cladding material at the heating site temperature, T; and
continually feeding the fiber through the localized heating site to move each molten droplet out of the localized heating site as each molten droplet is formed, to solidify each molten droplet, producing a longitudinal sequence of solid particles in the fiber, parallel to the longitudinal fiber axis, each particle being separated from other particles in the sequence by the fiber cladding material.

2. The method of claim 1 wherein feeding the fiber through a localized heating site comprises feeding the fiber through a localized flame.

3. The method of claim 1 wherein feeding the fiber through a localized heating site comprises feeding the fiber in proximity to a heating element at a distance that melts the fiber core.

4. The method of claim 1 wherein the fiber feed speed, $\upsilon_f$, is between 1 µm/second and 1 mm/second.

5. The method of claim 1 wherein providing a fiber comprises providing a fiber having a core comprising a crystalline material, whereby each solid particle in the fiber comprises a crystalline particle.

6. The method of claim 1 wherein providing a fiber comprises providing a fiber having a core comprising a semiconducting material, whereby each solid particle in the fiber comprises a semiconducting particle.

7. The method of claim 1 wherein providing a fiber comprises providing a fiber having a core comprising a metal, whereby each solid particle in the fiber comprises a metal.

8. The method of claim 1 wherein providing a fiber comprises providing a fiber having a core comprising a polymer material, whereby each solid particle in the fiber comprises a polymer particle.

9. The method of claim 1 wherein providing a fiber comprises providing a fiber having a core comprising a semiconducting glass, whereby each solid particle in the fiber comprises a semiconducting glass particle.

10. The method of claim 1 wherein providing a fiber comprises providing a fiber having a silica cladding layer.

11. The method of claim 1 wherein providing a fiber comprises providing a fiber having a polymer cladding layer.

12. The method of claim 1 wherein providing a fiber comprises providing a fiber having a core comprising a material selected from the group consisting of silicon and germanium.

13. The method of claim 1 wherein providing a fiber comprises providing a fiber having a core comprising a material selected from the group consisting of tin, copper, silver, and antimony.

14. The method of claim 1 wherein providing a fiber comprises providing a fiber including at least two fiber cores, each fiber core comprising a different core material and each core having a longitudinal axis parallel to the longitudinal fiber axis and internally disposed to at least one outer fiber cladding layer of cladding material along the fiber length, the two fiber cores being separated by an amount of fiber cladding whereby feeding the fiber through the localized heating site causes molten droplets to pinch off of each fiber core material simultaneously and form a plurality of separated longitudinal sequences of particles in the fiber, each sequence of particles separated from other sequences by the fiber cladding.

15. The method of claim 1 wherein providing a fiber comprises providing a fiber including at least two fiber cores, each fiber core comprising a different core material and each core having a longitudinal axis parallel to the longitudinal fiber axis and internally disposed to at least one outer fiber cladding layer of cladding material along the fiber length, the two fiber cores being separated by an amount of fiber cladding whereby feeding the fiber through the localized heating site causes molten droplets to pinch off of each fiber core material simultaneously and form multi-spherical molten droplets that solidify into multi-spherical particles in the fiber.

16. The method of claim 1 wherein providing a fiber including at least two fiber cores comprises providing a first semiconducting core that is electronically doped p-type and providing a second semiconducting core that is electronically doped n-type, whereby forming multi-spherical molten droplets that solidify into multi-spherical particles comprises forming multi-spherical p-n junction particles.

17. The method of claim 1 wherein feeding the fiber through a localized heating site at a heating site temperature, T, comprises feeding the fiber through a localized temperature of at least 1600° C.

18. The method of claim 1 further comprising removing the fiber cladding material to release the solid particles from the fiber.

19. The method of claim 18 further comprising passivating released solid particles to prevent agglomeration of released particles.

* * * * *